United States Patent
Claessens et al.

(10) Patent No.: US 12,235,500 B2
(45) Date of Patent: Feb. 25, 2025

(54) FIBER MANAGEMENT TRAY ARRANGEMENTS AND ASSEMBLIES FOR FIBER OPTIC CLOSURE ORGANIZERS

(71) Applicant: COMMSCOPE TECHNOLOGIES LLC, Hickory, NC (US)

(72) Inventors: Bart Mattie Claessens, Hasselt (BE); Pieter Doultremont, Kermt-Hasselt (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 105 days.

(21) Appl. No.: 17/798,522

(22) PCT Filed: Feb. 11, 2021

(86) PCT No.: PCT/US2021/017698
§ 371 (c)(1),
(2) Date: Aug. 9, 2022

(87) PCT Pub. No.: WO2021/163356
PCT Pub. Date: Aug. 19, 2021

(65) Prior Publication Data
US 2023/0090507 A1    Mar. 23, 2023

Related U.S. Application Data

(60) Provisional application No. 62/972,919, filed on Feb. 11, 2020.

(51) Int. Cl.
*G02B 6/44* (2006.01)
(52) U.S. Cl.
CPC ......... *G02B 6/4441* (2013.01); *G02B 6/4455* (2013.01)

(58) Field of Classification Search
CPC .................................................. G02B 6/4445
See application file for complete search history.

(56) References Cited

U.S. PATENT DOCUMENTS

| | | | |
|---|---|---|---|
| 7,418,184 B1 * | 8/2008 | Gonzales | G02B 6/4455 385/134 |
| 8,111,966 B2 * | 2/2012 | Holmberg | G02B 6/4457 385/134 |
| 8,213,760 B2 * | 7/2012 | Rudenick | G02B 6/4455 385/134 |
| 9,140,870 B2 * | 9/2015 | Marmon | G02B 6/44526 |

(Continued)

FOREIGN PATENT DOCUMENTS

| | | |
|---|---|---|
| WO | 2017/046190 A2 | 3/2017 |
| WO | 2019/160995 A1 | 8/2019 |

(Continued)

OTHER PUBLICATIONS

International Search Report and Written Opinion of the International Searching Authority for International Patent Application No. PCT/US2021/017698 mailed Jun. 4, 2021, 11 pages.

*Primary Examiner* — Rhonda S Peace
(74) *Attorney, Agent, or Firm* — Merchant & Gould P.C.

(57) ABSTRACT

Devices, arrangements and methods for routing and connecting optical fibers at fiber organizers of telecommunications closures. The organizers include pivotal tray arrangements for improved versatility and quantity of fiber routing configurations within a telecommunications closure of a given size.

20 Claims, 26 Drawing Sheets

(56) References Cited

U.S. PATENT DOCUMENTS

| | | | |
|---|---|---|---|
| 10,114,187 B2* | 10/2018 | Allen | G02B 6/44528 |
| 10,371,912 B2* | 8/2019 | Coenegracht | H02G 15/013 |
| 10,684,437 B2* | 6/2020 | Kaplan | G02B 6/4447 |
| 11,422,327 B2* | 8/2022 | Geens | G02B 6/44465 |
| 11,892,696 B2* | 2/2024 | Geens | G02B 6/44515 |
| 2005/0271344 A1 | 12/2005 | Grubish et al. | |
| 2011/0255837 A1 | 10/2011 | Solheid et al. | |
| 2015/0117829 A1* | 4/2015 | Allen | G02B 6/44528 |
| | | | 385/135 |
| 2017/0045701 A1 | 2/2017 | Diepstraten et al. | |
| 2019/0265426 A1 | 8/2019 | Zhejian et al. | |
| 2023/0090507 A1* | 3/2023 | Claessens | G02B 6/4441 |

FOREIGN PATENT DOCUMENTS

| | | |
|---|---|---|
| WO | 2020/154418 A1 | 7/2020 |
| WO | 2021/163340 A1 | 8/2021 |

* cited by examiner

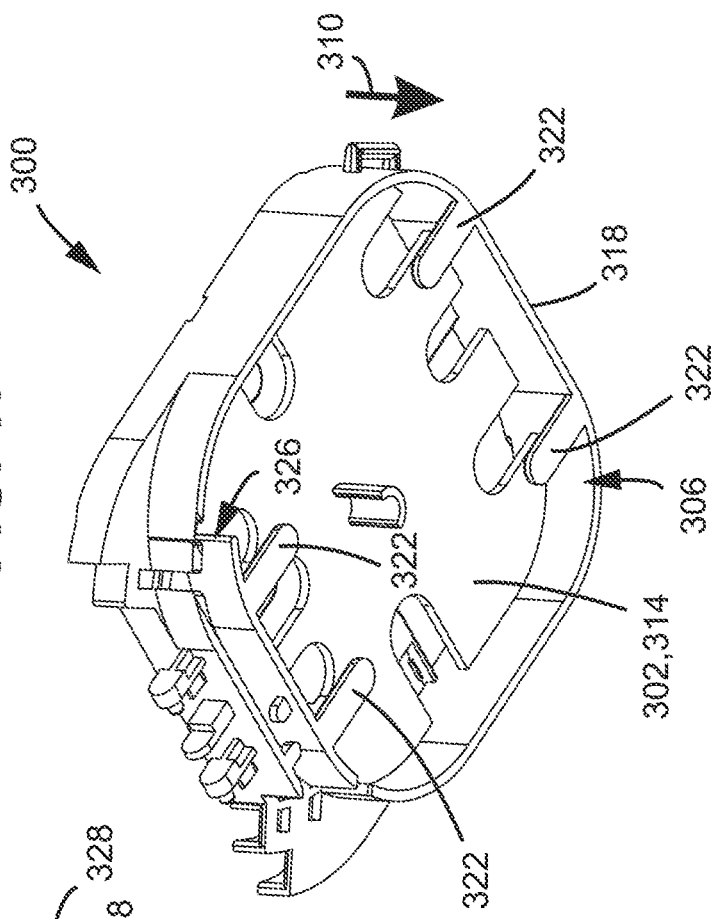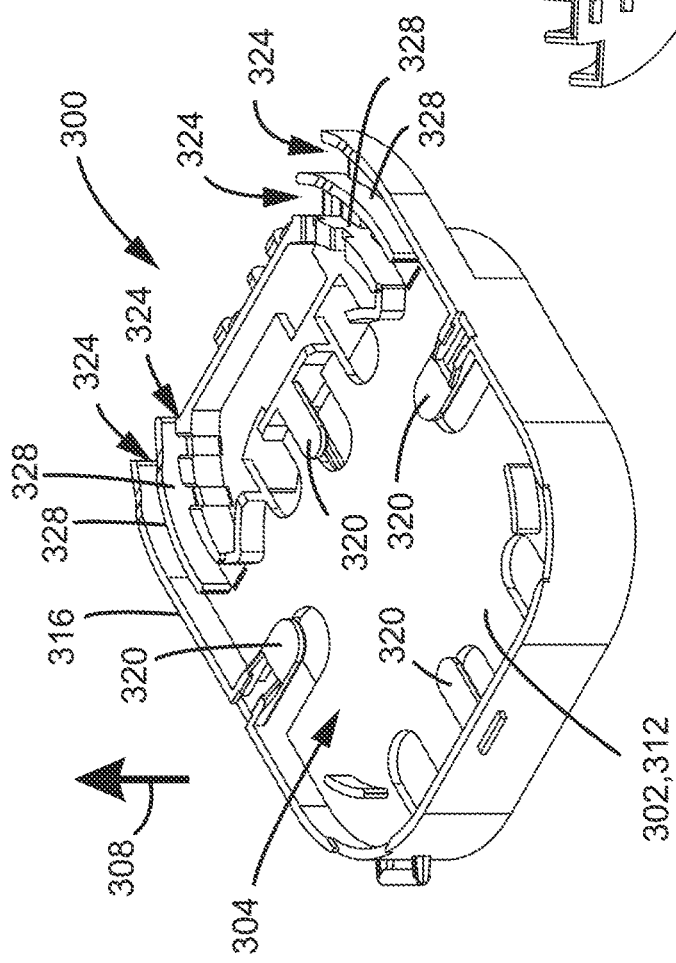

FIBER MANAGEMENT TRAY ARRANGEMENTS AND ASSEMBLIES FOR FIBER OPTIC CLOSURE ORGANIZERS

CROSS-REFERENCE TO RELATED APPLICATION

This application is a National Stage Application of PCT/US2021/017698, filed on Feb.11, 2021, which claims the benefit of U.S. Patent Application Ser. No. 62/972,919, filed on Feb. 11, 2020, the disclosures of which are incorporated herein by reference in their entireties. To the extent appropriate, a claim of priority is made to each of the above-disclosed applications.

TECHNICAL FIELD

The present disclosure relates to telecommunications enclosures, and more particularly to fiber management arrangements for routing and managing fibers at fiber organizer assemblies housed in telecommunications closures.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures.

In certain applications, the enclosure/housing needs to be water and contaminant (e.g., dust) proof or water-resistant. In particular, water, moisture, cleaning fluids, dust etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. One or more sealing blocks (e.g., gel blocks) housed in one of the housing pieces can be compressed against corresponding sealing blocks in another housing piece to form a seal therebetween. To accommodate cables or entering the enclosure through ports in the enclosure wall, corresponding sealing blocks positioned at the port locations of the enclosure can include sealing blocks that define cable passages such that the sealing blocks can be compressed around the cable forming a seal.

Typically, telecommunications closures house a fiber organizing assembly having equipment for organizing fibers, storing fibers, and optically connecting provider side fibers to subscriber side fibers. A given closure can accommodate different types of optical connections between fibers, such as connector to connector connections and splice connections. The organizer is typically sized according to the interior volume of the closure. It is generally desirable to maximize the number of fibers that can be managed within a given closure volume, as well as to maximize the versatility of the closure to manage different types of optical connections and different types of cables.

SUMMARY

In general terms, the present disclosure is directed to improvements in fiber management equipment of fiber organizers of telecommunications closures.

In one aspect, the present disclosure is directed to an improved telecommunications closure.

In another aspect, the present disclosure is directed to an improved organizer of a telecommunications closure.

In another aspect, the present disclosure is directed to an improved fiber management tray arrangement of an organizer of a telecommunications closure.

In another aspect, the present disclosure is directed to an improved fibber routing configuration using an organizer of a telecommunications closure and a tray arrangement of the organizer in accordance with principles of the present disclosure.

According to certain aspects of the present disclosure, a fiber management organizer for a telecommunications closure, comprises: a main body including a wall defining an upper region above the wall and a lower region below the wall, the upper region including an upper cable fixation portion and an upper fiber management portion, the lower region including a lower cable fixation portion and a lower fiber management portion; a first fiber management tray pivotally coupled to the main body at the upper fiber management portion, the first fiber management tray including: a first fiber management surface facing a first direction; a second fiber management surface facing a second direction opposite the first direction; a first wall projecting from the first fiber management surface in the first direction about at least a portion of an outer perimeter of the first fiber management surface; and a second wall projecting from the first fiber management surface in the second direction about at least a portion of an outer perimeter of the second fiber management surface; wherein each of the first and second fiber management surfaces define structures for mounting optical fiber splice holders at the first and second fiber management surfaces, respectively.

According to further aspects of the present disclosure, a fiber management organizer for a telecommunications closure is provided, the fiber management organizer extending along a longitudinal axis between a proximal end and a distal end of the fiber management organizer, along a transverse axis between a first side and a second side of the fiber management organizer, and along a vertical axis between a top and a bottom of the fiber management organizer, the fiber management organizer comprising: a main body including a wall defining an upper region above the wall and a lower region below the wall, the upper region including an upper cable fixation portion and an upper fiber management portion, the lower region including a lower cable fixation portion and a lower fiber management portion; a first fiber management tray pivotally coupled to the main body at the upper fiber management portion by a first hinge defining a first pivot axis, the first fiber management tray being pivotal in a first pivot direction about the first pivot axis between a first storage position and a first access position; and a second fiber management tray pivotally coupled to the main body at the upper fiber management portion by a second hinge defining a second pivot axis, the second fiber management tray being pivotal about the second pivot axis in a second pivot direction between a second storage position and a second access position, wherein the first and second fiber management trays are vertically stacked one above the other when the first and second fiber management trays are in the storage positions; and wherein the first and second pivot directions are different from each other.

According to further aspects of the present disclosure, a fiber management organizer for a telecommunications closure, comprises: a main body including a wall defining an upper region above the wall and a lower region below the wall, the upper region including an upper cable fixation portion and an upper fiber management portion, the lower region including a lower cable fixation portion and a lower fiber management portion; a first fiber management tray pivotally coupled to the main body at the upper fiber management portion, the first fiber management tray including a wall dividing a first fiber loop storage basket defined by the first fiber management tray from a second fiber loop storage basket defined by the first fiber management tray; and a group of sheathed optical fibers housed in a sheath, a first length of the sheath being stored at the lower fiber management portion, the sheath extending from the lower fiber management portion to the first fiber loop storage basket, a second length of the sheath being stored in the first fiber loop storage basket, the sheath terminating at a sheath end positioned in the first fiber loop storage basket, the group of optical fibers extending from the sheath end to the second fiber loop storage basket via a fiber pathway defined by the fiber management tray, first lengths of the group of optical fibers being stored in loops in the second fiber loop storage basket.

According to further aspects of the present disclosure, fiber management organizer for a telecommunications closure, comprises: a main body including a wall defining an upper region above the wall and a lower region below the wall, the upper region including an upper cable fixation portion and an upper fiber management portion, the lower region including a lower cable fixation portion and a lower fiber management portion; a first fiber management tray pivotally coupled to the main body at the upper fiber management portion, the first fiber management tray including: a first fiber management surface facing a first direction; a second fiber management surface facing a second direction opposite the first direction; a first wall projecting from the first fiber management surface in the first direction about at least a portion of an outer perimeter of the first fiber management surface; and a second wall projecting from the first fiber management surface in the second direction about at least a portion of an outer perimeter of the second fiber management surface, wherein first and second fiber management surfaces define first and second structures, respectively for mounting optical fiber splice holders at the first and second fiber management surfaces, respectively; a first group of optical fibers extending from the lower fiber management portion to the first fiber management surface, the first group of optical fibers being spliced to second optical fibers at splices held at splice holders mounted to the first structures, the second optical fibers extending from the first fiber management surface to the lower fiber management portion; and a third group of optical fibers extending from the lower fiber management portion to the second fiber management surface, the third group of optical fibers being spliced to fourth optical fibers at splices held at splice holders mounted to the second structures, the fourth optical fibers extending from the first fiber management surface to the lower fiber management portion.

According to further aspects of the present disclosure, a method comprises: providing a fiber management organizer for a telecommunications closure, including a main body including a wall defining an upper region above the wall and a lower region below the wall, the upper region including an upper cable fixation portion and an upper fiber management portion, the lower region including a lower cable fixation portion and a lower fiber management portion; routing a first optical fiber from the lower fiber management portion to a first side of a back-to-back fiber management tray pivotally coupled to the main body; and routing a second optical fiber from the lower fiber management portion to a second side of the back-to-back fiber management tray, the first and second sides facing opposite directions.

According to further aspects of the present disclosure, a method comprises: providing a fiber management organizer for a telecommunications closure, including a main body including a wall defining an upper region above the wall and a lower region below the wall, the upper region including an upper cable fixation portion and an upper fiber management portion, the lower region including a lower cable fixation portion and a lower fiber management portion; routing a first optical fiber from the lower fiber management portion to a first side of a back-to-back fiber management tray pivotally coupled to the main body; and routing the first optical fiber from the first side of the back-to-back fiber management tray to a second side of the fiber management tray, the second side being opposite the first side.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 16 is a top perspective view of the lower back-to-back tray of the organizer of FIG. 3.

FIG. 17 is a bottom perspective view of the lower back-to-back tray of the organizer of FIG. 3.

DETAILED DESCRIPTION

Figure 1:
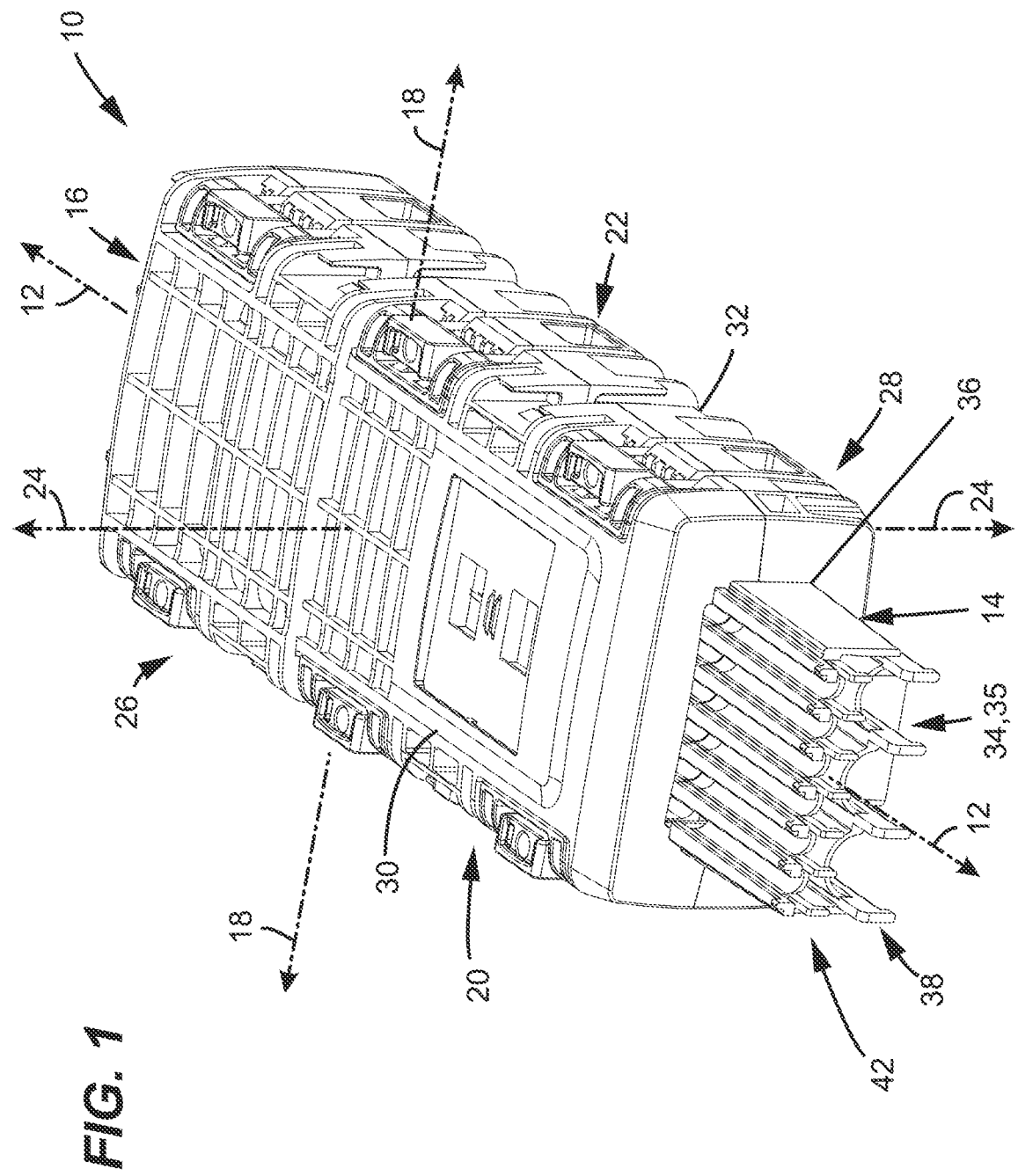
FIG. 1 is a perspective view of a telecommunications closure in accordance with the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
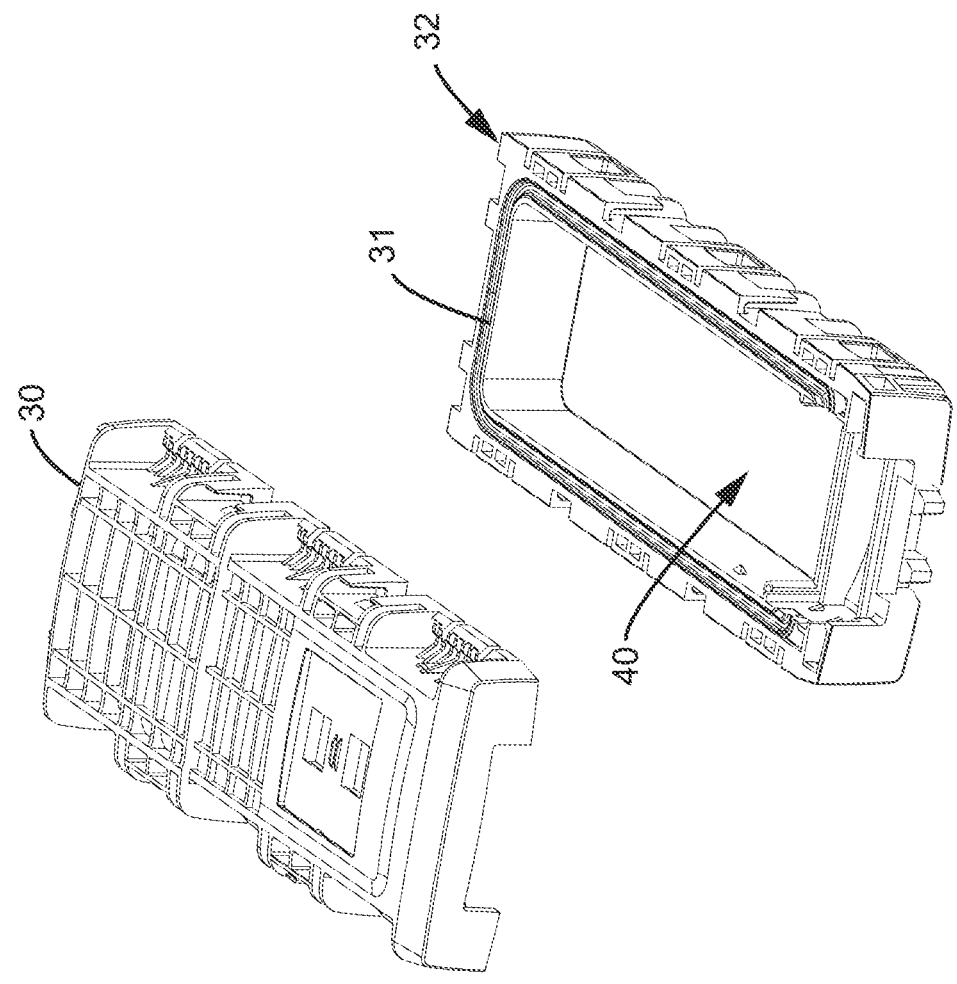
FIG. 2 is a perspective view of the housing pieces of the closure of FIG. 1.

Referring to FIGS. 1-2, a telecommunications closure 10 extends along a longitudinal axis 12 between a proximal end 14 and a distal end 16. The closure 10 extends along a transverse axis 18 between a first side 20 and a second side 22. The closure 10 extends along a vertical axis 24 between a top 26 and a bottom 28. The axes 12, 18 and 24 are mutually perpendicular, with the axes 12 and 18 defining a horizontal plane.

As used herein, terms such as proximal, distal, top, bottom, upper, lower, vertical, horizontal and so forth will be used with reference to the axes 12, 18, and 24 of FIG. 1 and in relating the positions of one component to another with respect to the full closure assembly of FIG. 1. These relative terms are for ease of description only, and do not limit how the closure 10 or any individual component or combination of components, may be oriented in practice.

The closure 10 includes a first upper housing piece 30 and a second lower housing piece 32 that cooperate (e.g., with hinges, clamps, etc.) to form a sealable and re-enterable closure volume 40. A perimeter seal element 31 forms a seal about three sides of the closure volume 40 when the closure 10 is in a sealed and closed configuration.

The closure volume 40 is configured to house a cable organizer 34. An internal portion (not shown in FIGS. 1-2) of the cable organizer 34 is positioned within the closure volume 40. An external portion 35 of the cable organizer 34 is positioned exterior to the closure volume 40, with the cable organizer 34 extending through a proximally positioned opening 36 defined between the proximal ends of the first and second housing pieces 30 and 32. Cables enter the closure volume 40 via the opening 36 and the sealed cable ports defined by the internal portion of the cable organizer 34.

The cable organizer 34 is configured to accommodate relatively thick cables (such as feeder cables and branch cables) entering the closure 10 via a lower region 38 of the cable organizer 34, and relatively thin cables (such as drop cables) entering the closure via an upper region 42 of the cable organizer 34.

Referring now to FIGS. 3-12, a cable organizer (or organizer) 100 in accordance with the present disclosure will be described. The cable organizer 100 can cooperate with housing pieces of a closure such as described above. For example, the cable organizer 100 can cooperate with the housing pieces 30, 32 as described above with respect to FIGS. 1 and 2, an internal portion of the organizer being positioned in the closure volume 40. Other than at the proximal side, the housing pieces 30-32 do not form another opening to the outside of the closure.

The organizer 100 extends along a longitudinal axis 102 from a proximal end 103 to a distal end 104, along a transverse axis 106 from a first side 108 to a second side 110, and along a vertical axis 112 from a top 114 to a bottom 116. The axes 102, 106 and 112 are mutually perpendicular, with the axes 102 and 106 defining a horizontal plane. The organizer 100 optionally includes an external portion 118 (FIG. 21) configured to be positioned outside of a closure volume and an internal portion 120 positioned distally from the external portion 118 and configured to be positioned within a closure volume. In some examples, the external portion 118 and the internal portion 120 of the organizer are of unitary construction. Alternatively, the external portion is constructed separately and attached to the internal portion.

Figure 13:
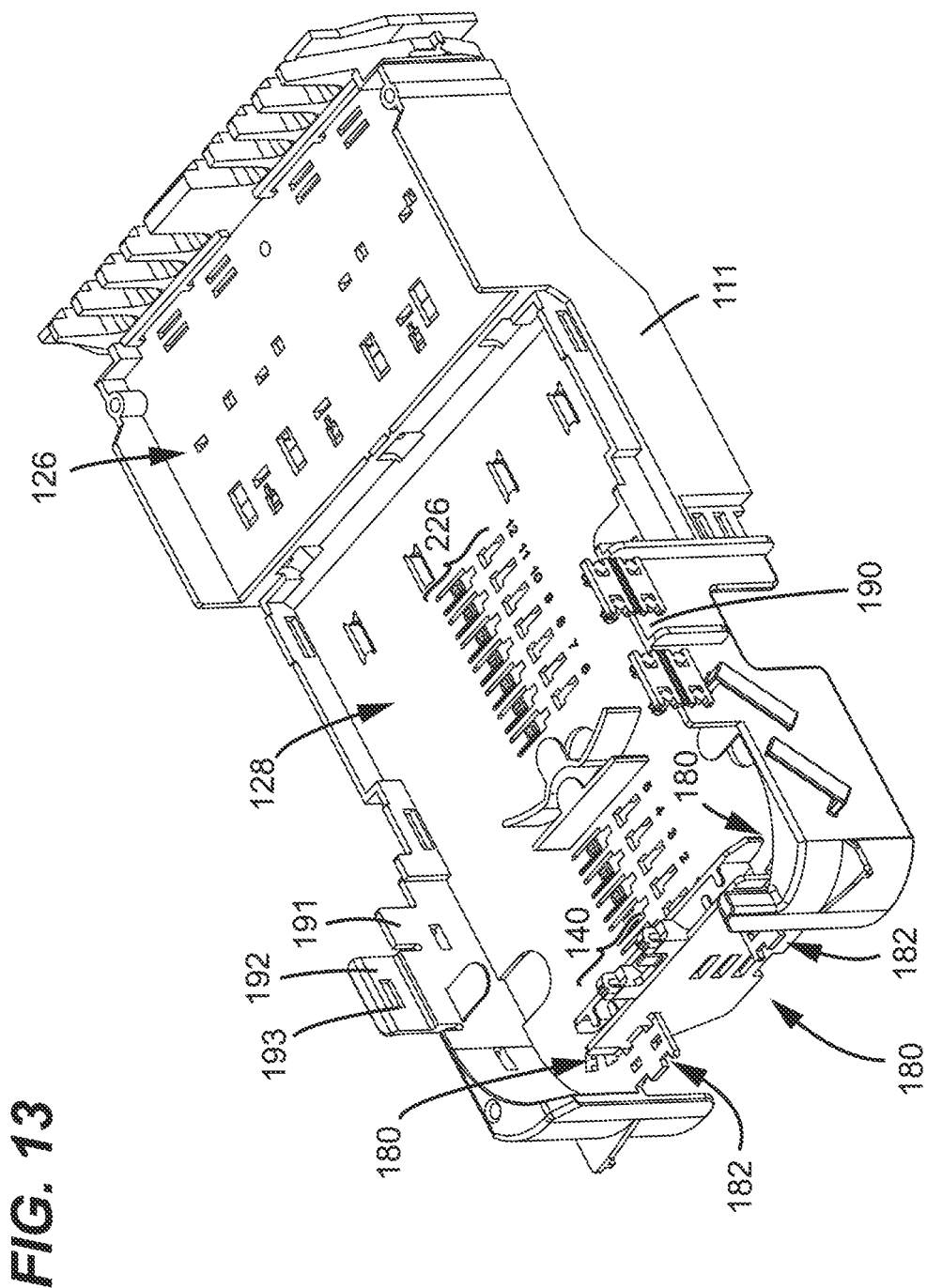
FIG. 13 is a top perspective view of the main body of the fiber organizer of FIG. 3.

The organizer 100 is generally divided by one or more panels, walls, or other structures between an upper region 122 and a lower region 124. Some of these panels, walls and other structures form an integrated unit that serves as a main support structure 111 of the organizer 100. In some examples, the internal portion 120 of the organizer 100 corresponds to the main support structure or main body 111, and the external portion 118 is coupled to the main body 111. The organizer 100 defines one or more channels 180 and other guiding structures for guiding optical fibers between the upper and lower regions. The channels 180 can include clipping interfaces 182 for mounting sheath clamps of sheaths containing fibers that are being routed between the upper and lower regions (FIG. 13) such that an optical fiber from a cable (e.g., a feeder cable or a branch cable) fixed in the lower region can be optically coupled to an optical fiber of a cable (e.g., a drop cable 50) fixed at the cable fixation region. In addition, fibers from provider side branch or feeder cables can be connected (e.g., spliced) to subscriber side branch cables, with both provider and subscriber side cables entering the closure and being fixed to the organizer 100.

The internal portion 120 includes in the upper region 122 a cable fixation portion 126, and a fiber management portion 128 positioned distally from the cable fixation portion 126. The internal portion 120 also includes in the lower region 124 a cable fixation portion 130 and a fiber management portion 132 positioned distally from the cable fixation portion 130. The cable fixation portions 126 and 130 are generally vertically aligned. The fiber management portions 128 and 132 are generally vertically aligned.

The lower fiber management portion 132 is partially defined by a side wall 134 and a horizontal downward facing surface 136 of a panel 138, together forming a basket 139. The basket 139 of the lower fiber management portion 132 can serve as a storage area for looped fiber from the feeder cables or branch cables. The looped fiber can be in the form of loose fibers, loose fibers protected in groups by tubes or sheaths, fiber ribbons, etc. Fibers can be guided from the lower fiber management portion 132 to the upper fiber management portion via guides and the channels 180 at the distal end of the organizer 100. Once at the upper fiber management portions, the fiber can be further managed, e.g., with splices, connectors and adapters, splitters, wave division multiplexors, etc.

The upper fiber management portion 128 can also include one or more banks 150 of fiber optic adapters 152. The adapters 152 can be used to optically connect connectorized drop cables 50 having connectors 52 with connectorized fibers 54 having connectors 56 terminating the fibers 54. In this example, two banks 150 of adapters 152 are arranged side by side parallel to the transverse axis 106. In other examples, zero or two banks of adapters can be provided aligned with one another parallel to the transverse axis 106. Where adapters are not longitudinally aligned with entering cables, non-connectorized drop cables can be fixed in the upper cable fixation portion 126 and their fibers managed in the upper fiber management portion 128. Thus, the upper region of the organizer 100 can accommodate connectorized drop cables, non-connectorized drop cables, or a combination of connectorized and non-connectorized drop cables. Other cable types and configurations can also be accommodated and managed at the cable fixation portion 126. In alternative examples, the adapters, or non-functional receptacles that behave like one-sided adapters, can serve as parking or storage for the connectors 52 or the connectors 56 until an active fiber optic connection is needed. The connectors can be any suitable form factor, such as, but not limited to, one or more of LC form factor, SC form factor, and MPO form factor connectors.

The upper cable fixation portion 126 and the lower cable fixation portion 130 are separated by a wall 154. The wall includes an upward facing horizontal surface 156 and a downward facing horizontal surface 158. The surfaces 156 and 158 can support cable fixation assemblies. Example cable fixation assemblies are described in, e.g., International PCT Patent Application No. PCT/US2020/014634 filed Jan. 22, 2020 and U.S. Provisional Patent Application No. 62/972,864, filed Feb. 11, 2020, the contents of which applications are fully incorporated herein by reference in their entireties.

Positioned proximally of the cable fixation portions 126 and 130 is a seal region 160 (FIG. 21) of the organizer 100. The seal region 160 includes a plurality of dividers 162 and 164 in the upper region 122 and the lower region 124, respectively, of the organizer 100. The dividers 162 define openings 166 through which connectorized drop cables 50 or non-connectorized drop cables enter the closure. The dividers 164 define openings 173 through which feeder cables, branch cables or the like enter the closure. In the space between rows of dividers there are placed seal blocks 174. The seal blocks 174 form seals around the cables entering the closure. The seal blocks 174 also serve to seal off the proximal opening of the closure defined between the housing pieces of the closure.

In an example cable configuration, one or two feeder cables enter the lower region 124 via cable ports at the proximal end of the organizer 100 and have jacketed portions affixed at the cable fixation portion 130. Optical fibers from the one or more feeder cables are stored in loops in the fiber management portion 132. In some examples, the optical fibers are held in protective sheaths that are stored in loops in the basket 139 of the fiber management portion 132. Each sheath can hold a plurality of fibers such as, e.g., 4, 6, 8, 10, 12 or more fibers. Portions of the sheaths can be routed to the upper region 122 via channels 180 at the rear of the main body 111 for further fiber management.

In addition, branch cables can enter the lower region 124 via further ones of the cable ports at the proximal end of the organizer 100, with jacketed portions of the branch cables being affixed at the cable fixation portion 130. For example, a provider side feeder or branch cable and a subscriber side branch cable can enter the closure at the lower region 124. Fibers from the provider side feeder or branch cable can be spliced to fibers of the subscriber side branch cable, with the fibers and splices being managed at the organizer 100. In some examples, the optical fibers of the branch cables are held in protective sheaths that are stored in loops in the basket 139 of the fiber management portion 132. Each sheath can hold a plurality of fibers such as, e.g., 4, 6, 8, 10, or 12 or more fibers. Portions of the sheaths can be routed to the upper region 122 via channels 180 at the rear of the main body 111 for further fiber management. The provider side feeder or branch cable can be routed to the closure from, e.g., another closure on the provider side of the network, e.g., larger closure. The subscriber side branch cable can be routed from the closure to another closure on the subscriber side of the network, e.g., a smaller closure, such as a multiport service terminal (MST).

Components and assemblies at the upper region 122 will now be described. In general terms, these components and assemblies can provide improvements and/or advantages in fiber routing and management capabilities using the organizer 100. The capabilities that can be improved can include higher numbers of fibers that can be managed per unit volume of the closure volume of the closure and/or versatility in the types of fiber management that can be performed using a single organizer 100 of a single closure.

The main body 111 includes the wall 154 defining the upper region 122 above the wall and a lower region 124 below the wall.

Referring to FIGS. 3-14, 18, 19, 28 and 29, an upper fiber management tray 200 is a back-to-back tray that is pivotally coupled to the main body 111 at the upper fiber management portion 130. Optionally, the fiber management tray 200 includes two trays that are coupled to each other back-to-back in a reversible manner. Optionally, the fiber management tray 200 includes two trays that are permanently affixed to each other back-to-back. Optionally, the fiber management tray 200 is of a single unitary (e.g., seamless) construction.

Figure 3:
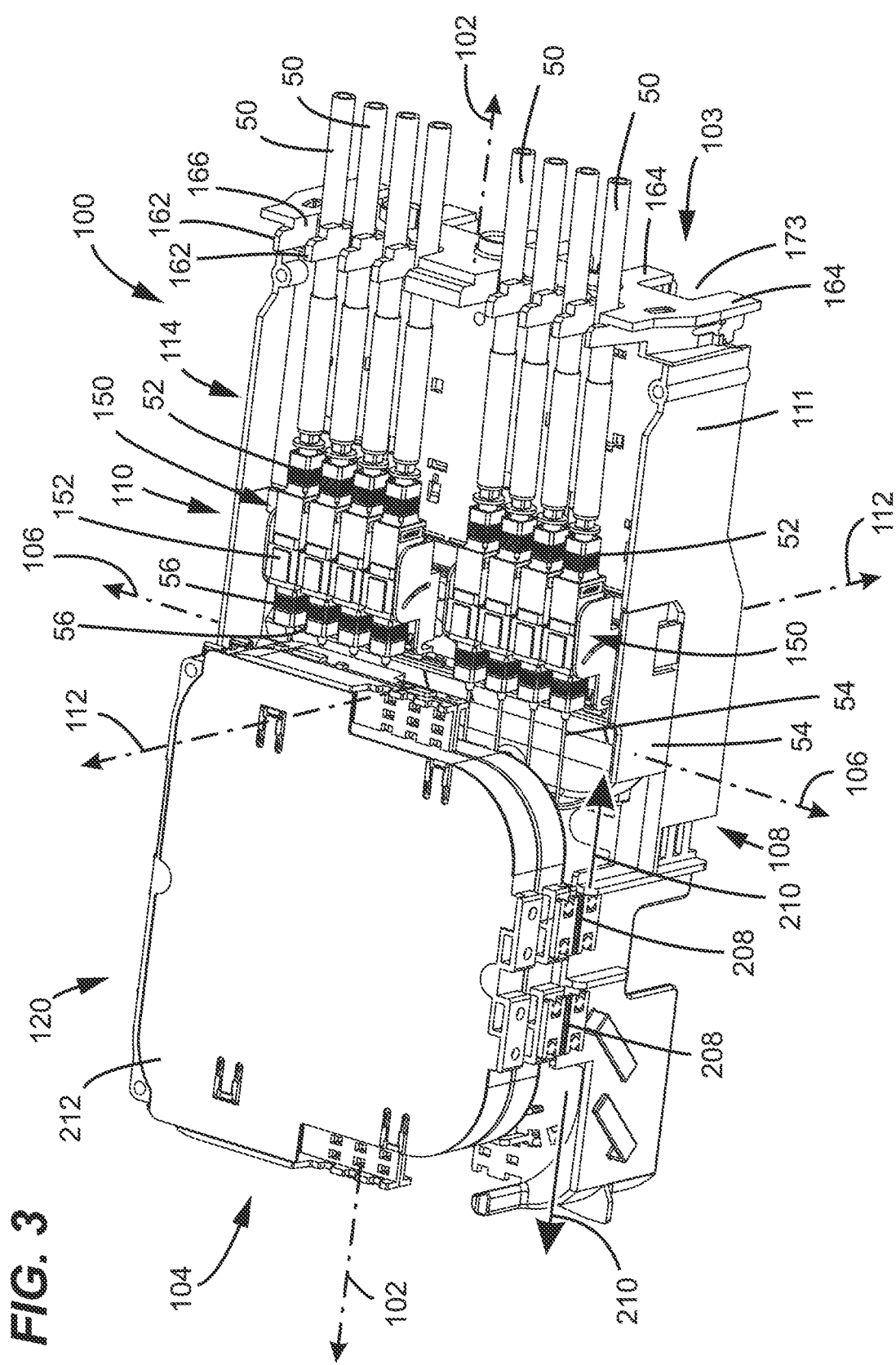
FIG. 3 is a perspective view of an assembly of an optical fiber management organizer according to the present disclosure, including cables and fibers, and with an upper back-to-back fiber management tray of the organizer being covered.
Figure 4:
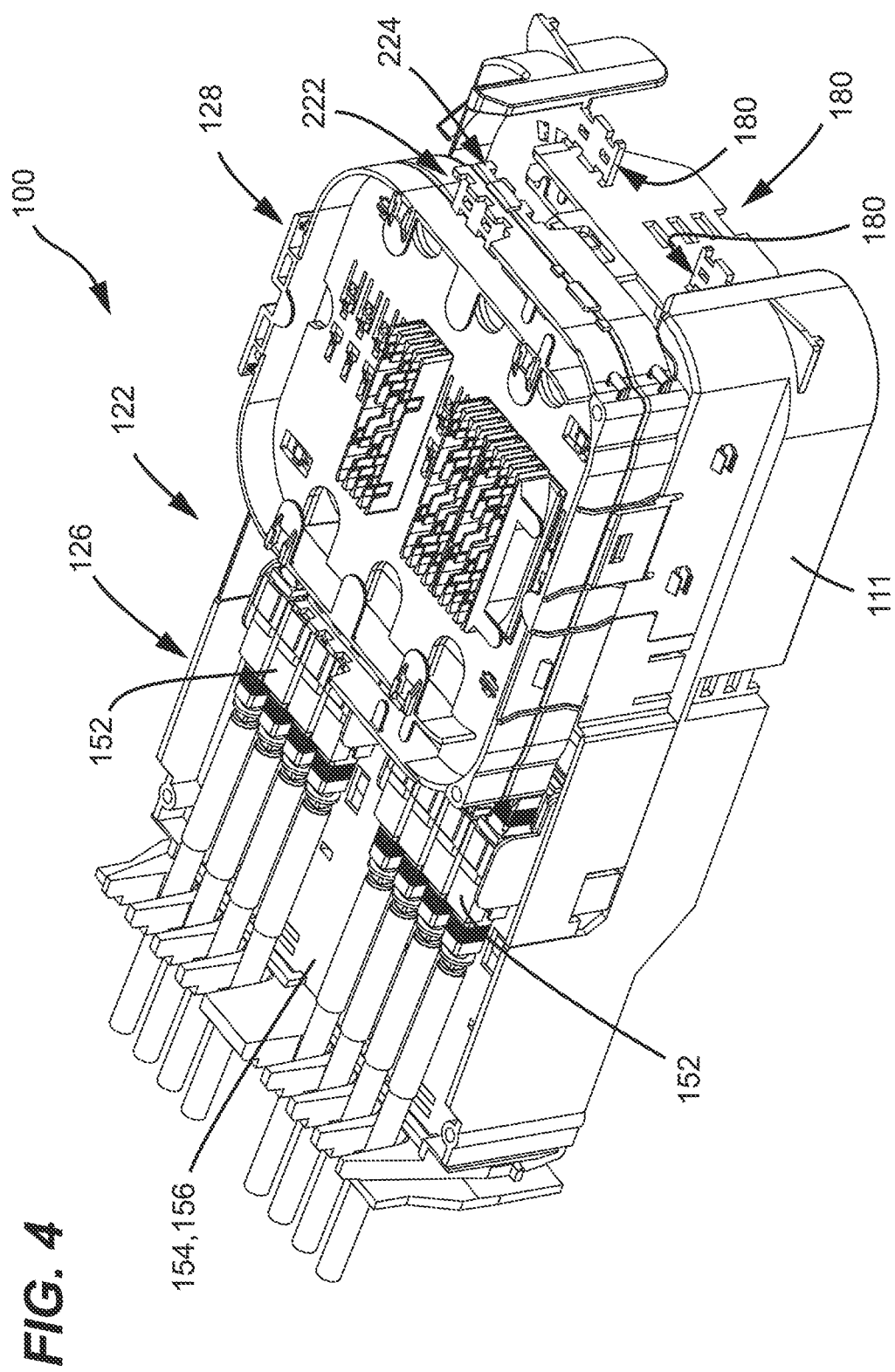
FIG. 4 is a perspective view of the assembly of FIG. 3, with the upper back-to-back fiber management tray being uncovered.
Figure 5:
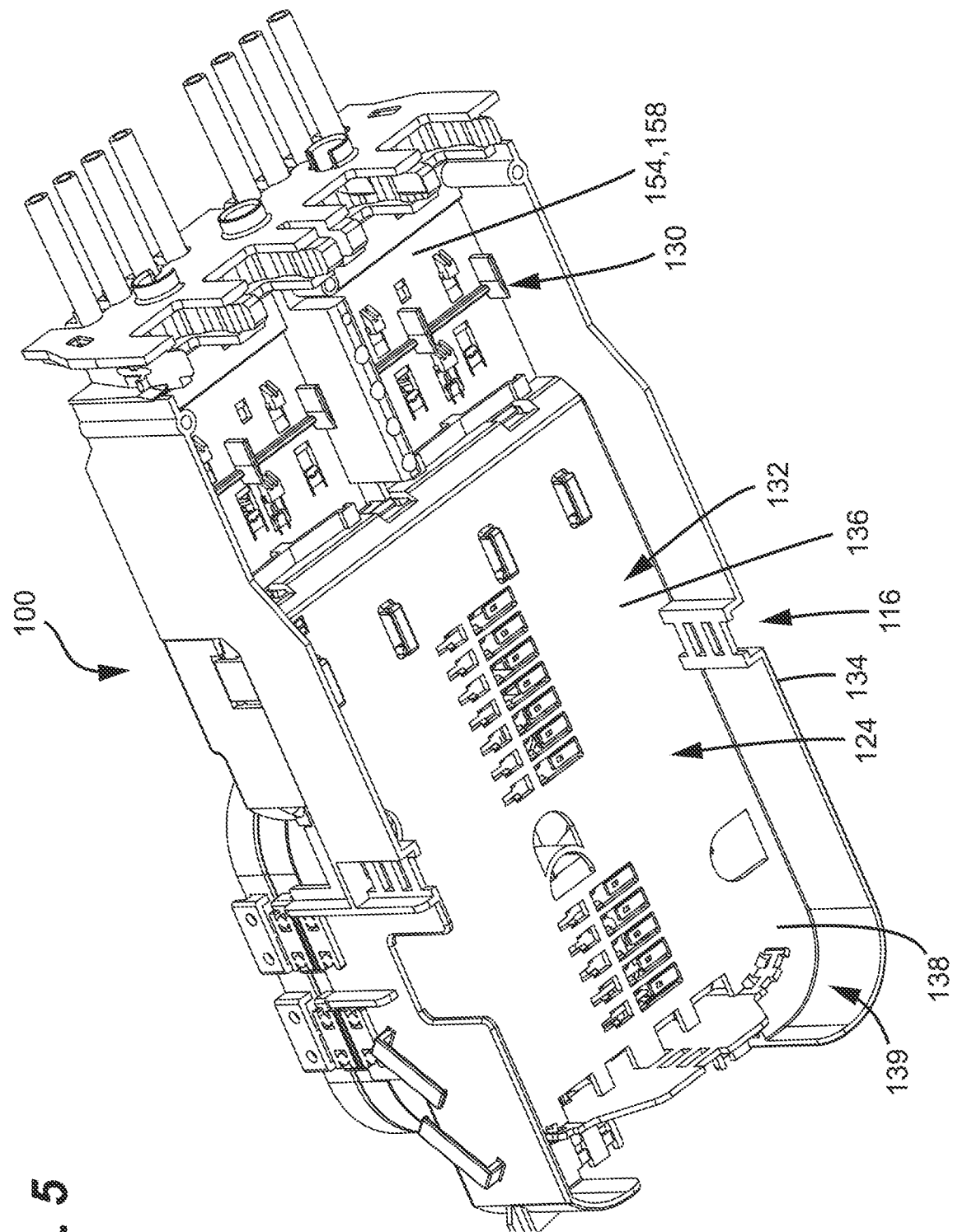
FIG. 5 is a further perspective view of the assembly of FIG. 3.
Figure 6:
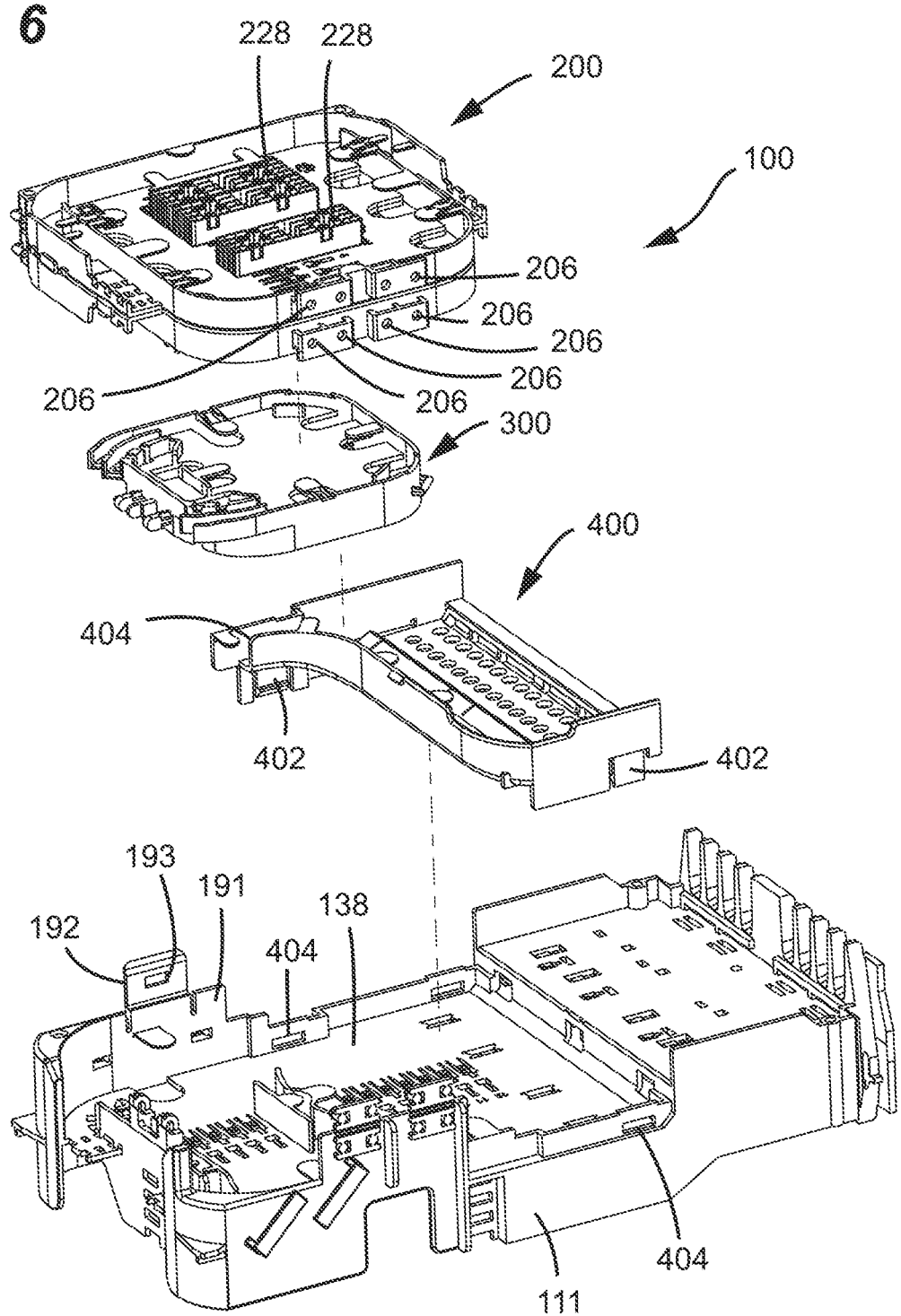
FIG. 6 is a partially exploded view of the organizer of FIG. 3.
Figure 7:
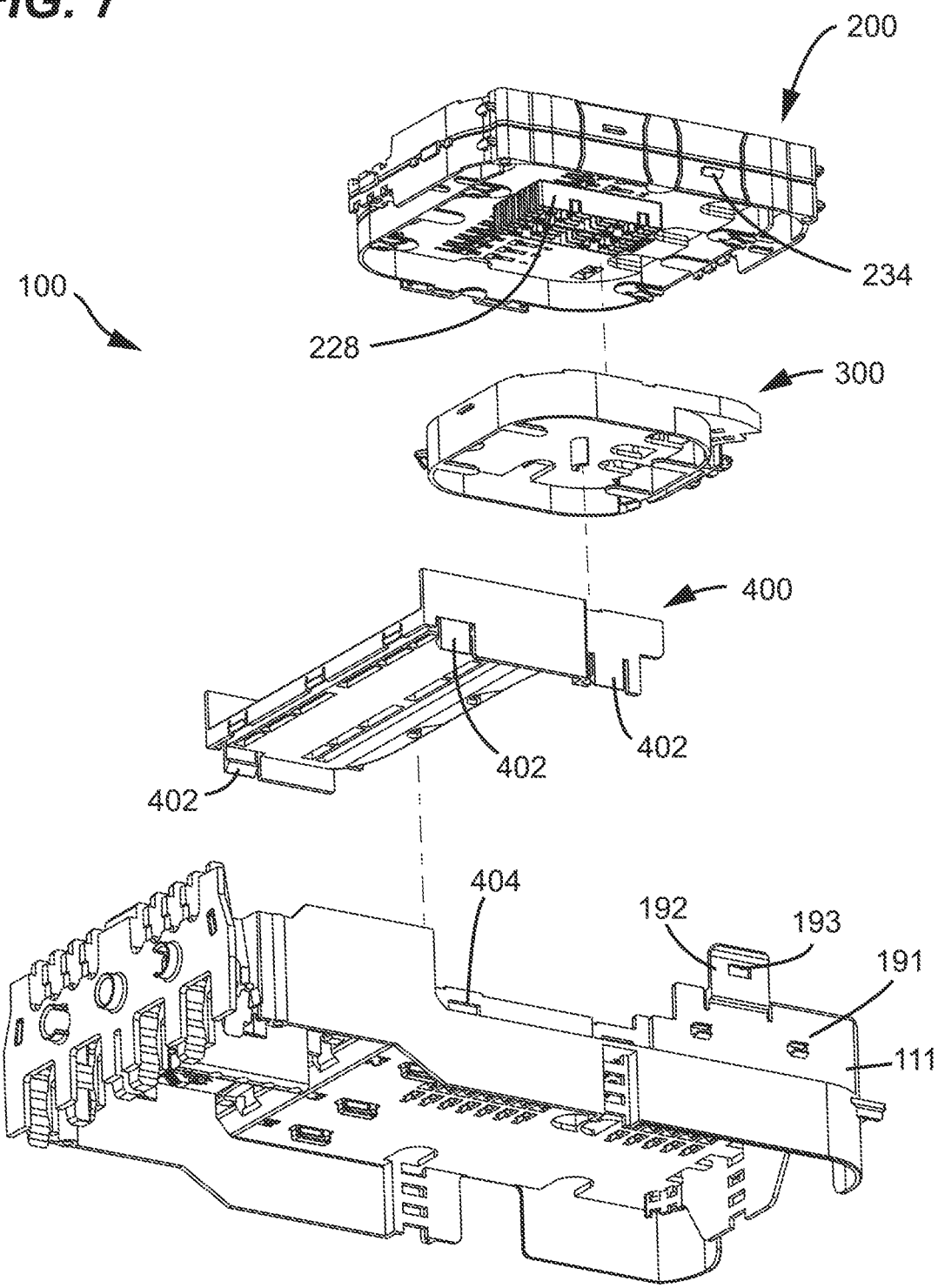
FIG. 7 is a further partially exploded view of the organizer of FIG. 3.
Figure 8:
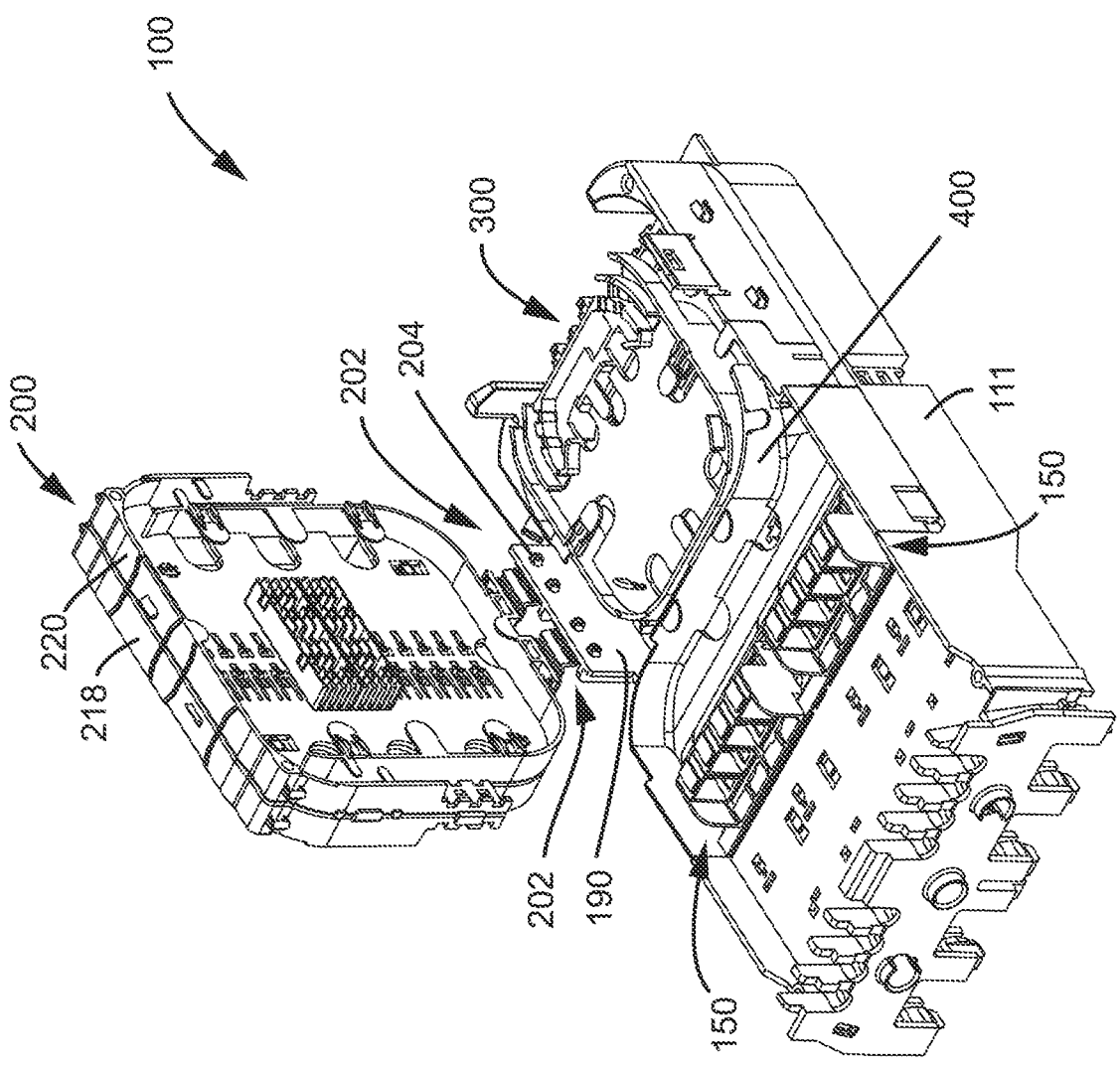
FIG. 8 is a perspective view of the organizer of FIG. 3, with the upper back-to-back fiber management tray in a pivoted up position, and a second back-to-back fiber management tray in a pivoted down position.
Figure 9:
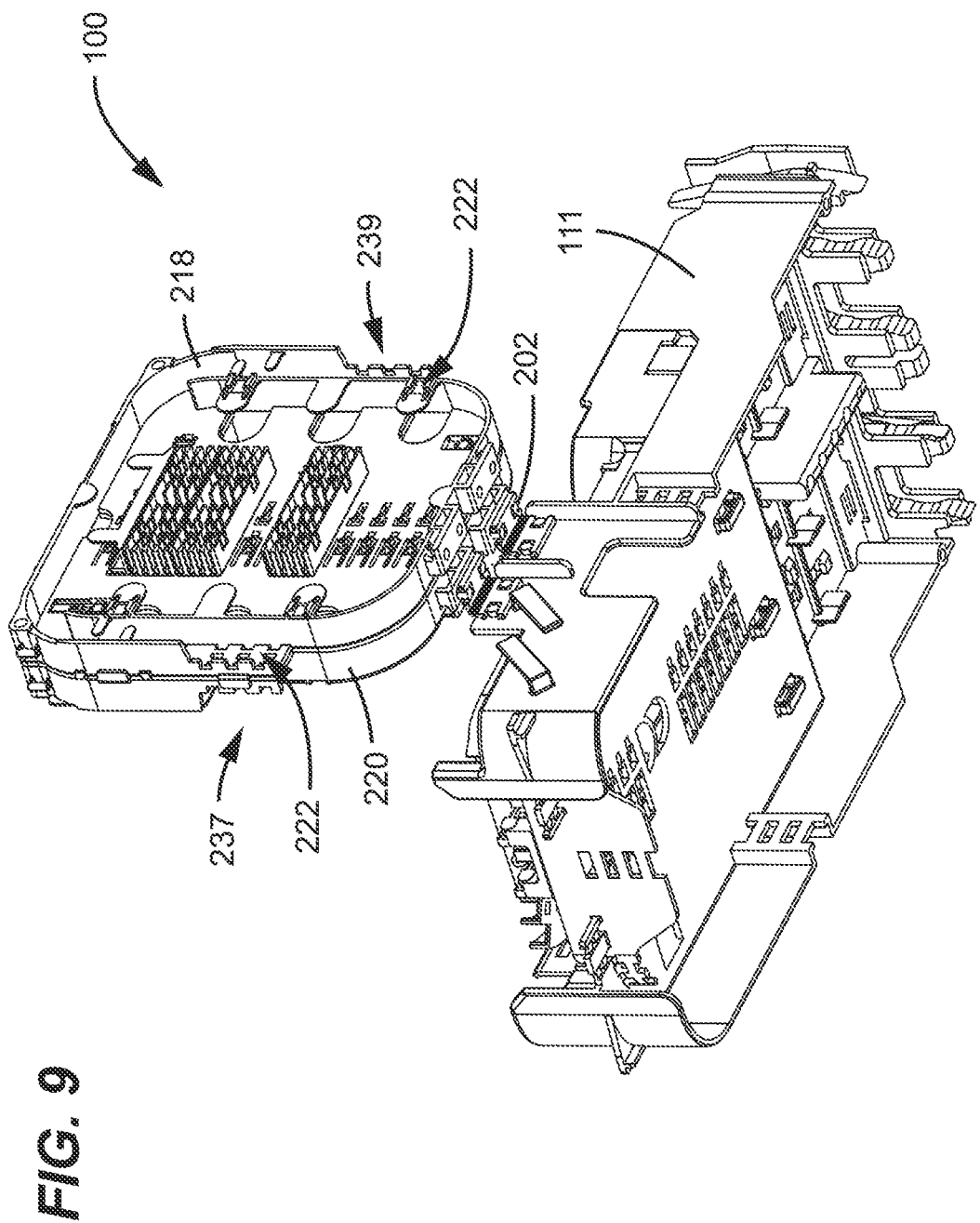
FIG. 9 is a further perspective view of the organizer of FIG. 3, with the upper back-to-back fiber management tray in the pivoted up position, and a lower back-to-back fiber management tray in the pivoted down position.
Figure 10:
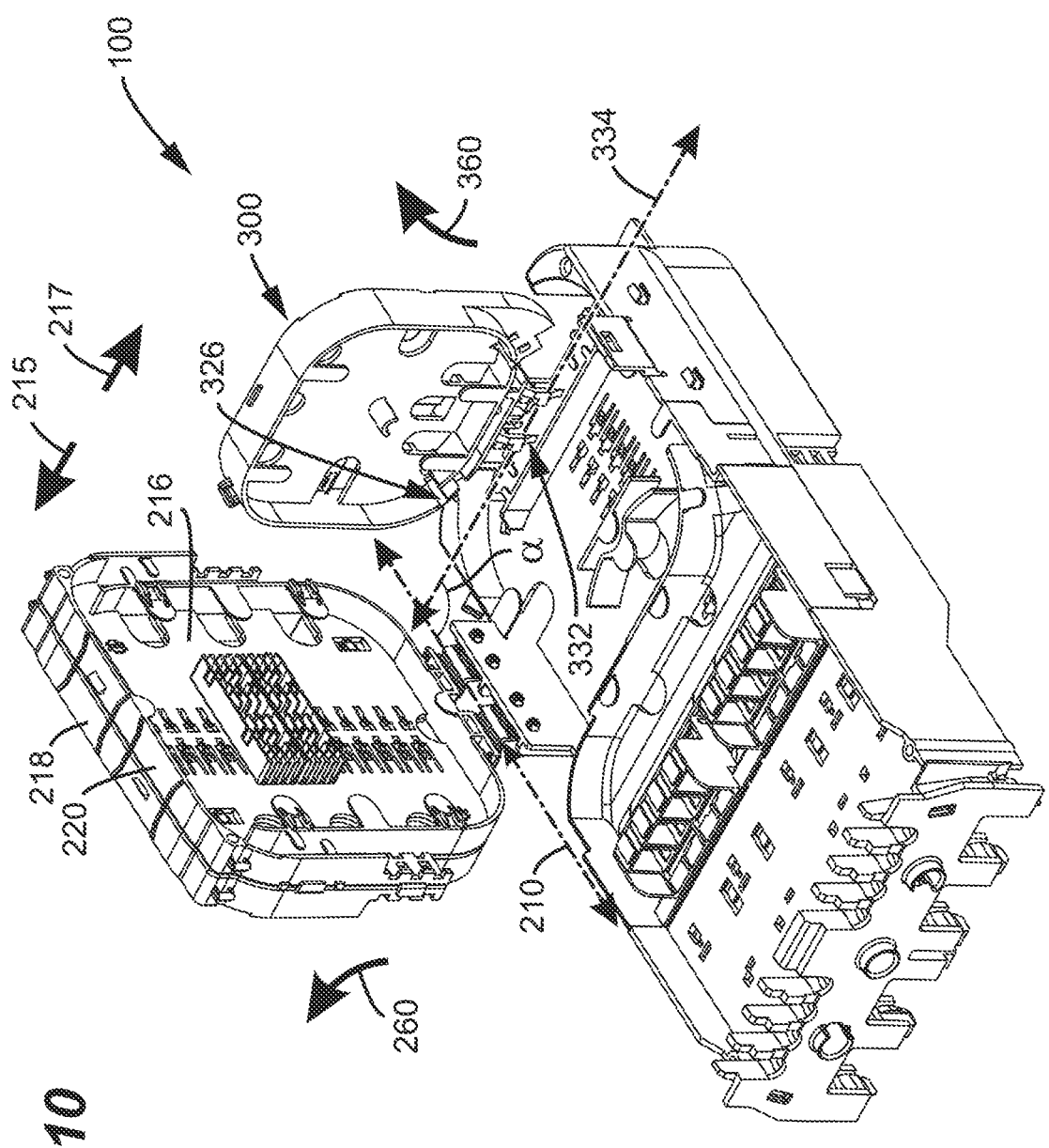
FIG. 10 is a perspective view of the organizer of FIG. 3, with the upper back-to-back fiber management tray in a pivoted up position, and the lower back-to-back fiber management tray in a pivoted up position.
Figure 11:
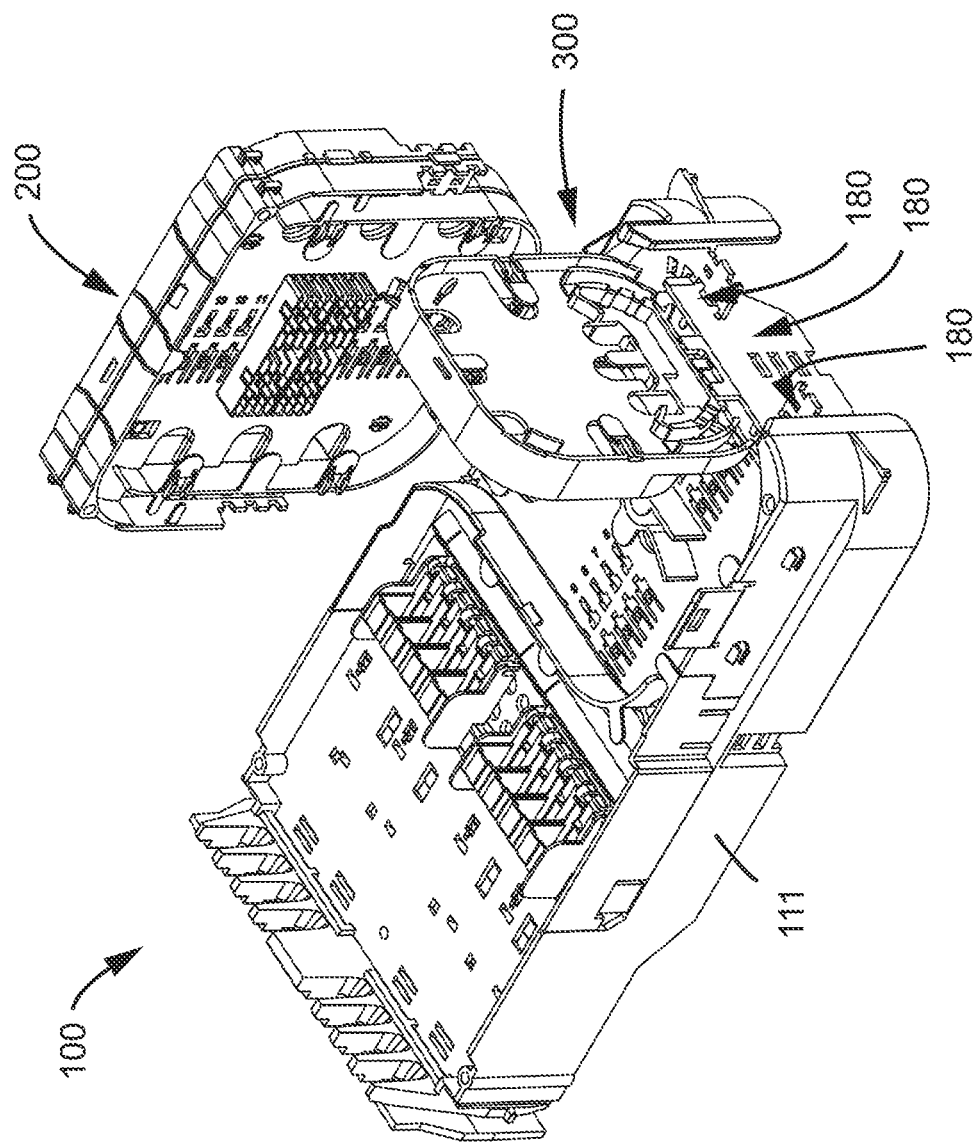
FIG. 11 is a further perspective view of the organizer of FIG. 3, with the upper back-to-back fiber management tray in the pivoted up position, and the second back-to-back fiber management tray in the pivoted up position.
Figure 12:
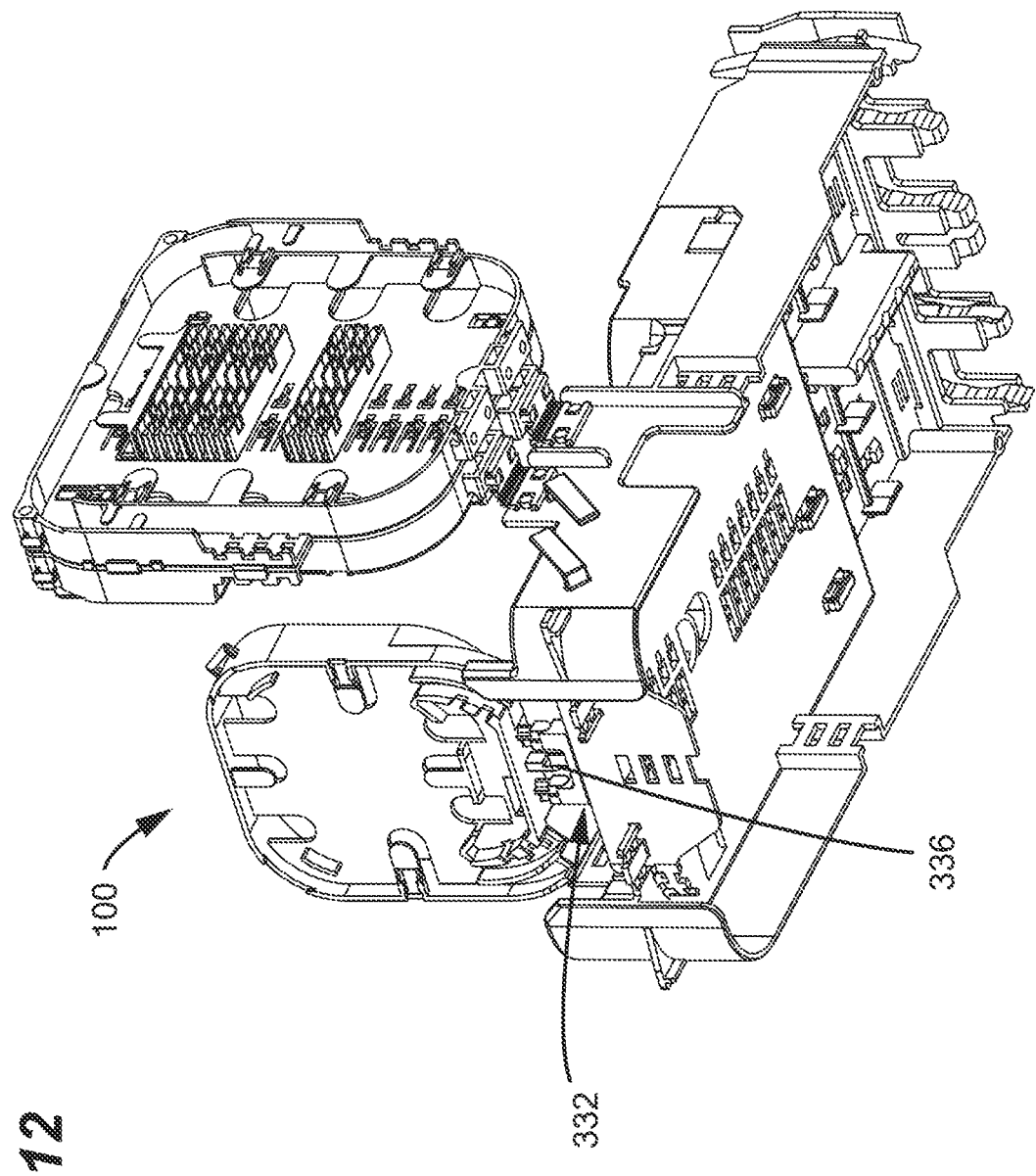
FIG. 12 is a further perspective view of the organizer of FIG. 3, with the upper back-to-back fiber management tray in the pivoted up position, and the second back-to-back fiber management tray in the pivoted up position.

Hinging clips 202 (FIGS. 28-29) include resilient pegs 204 that mechanically snap into holes in the wall 190 of the main body 111 and in holes or depressions 206 of the fiber management tray 200. Each hinge clip 202 includes a flexibly resilient hinge joint 208, and a hinge axis or pivot axis 210 is defined at the hinge clips 202 about which the tray 200 can pivot relative to the main body 111. In FIGS. 3 and 4 the upper tray 200 is in the pivoted down position, or storage position, about the pivot axis 210. In FIGS. 8, 9 and 10 the upper tray 200 is in the pivoted up position, or access position. Optionally, when fibers managed on either side of the tray 200 are not being managed, that side of the tray can be covered with a protective cover, such as the cover 212. To perform fiber management, the cover 212 can be removed and then replaced (e.g. by mechanically snapping it to the tray 200) after the fiber management has been performed.

Figure 14:
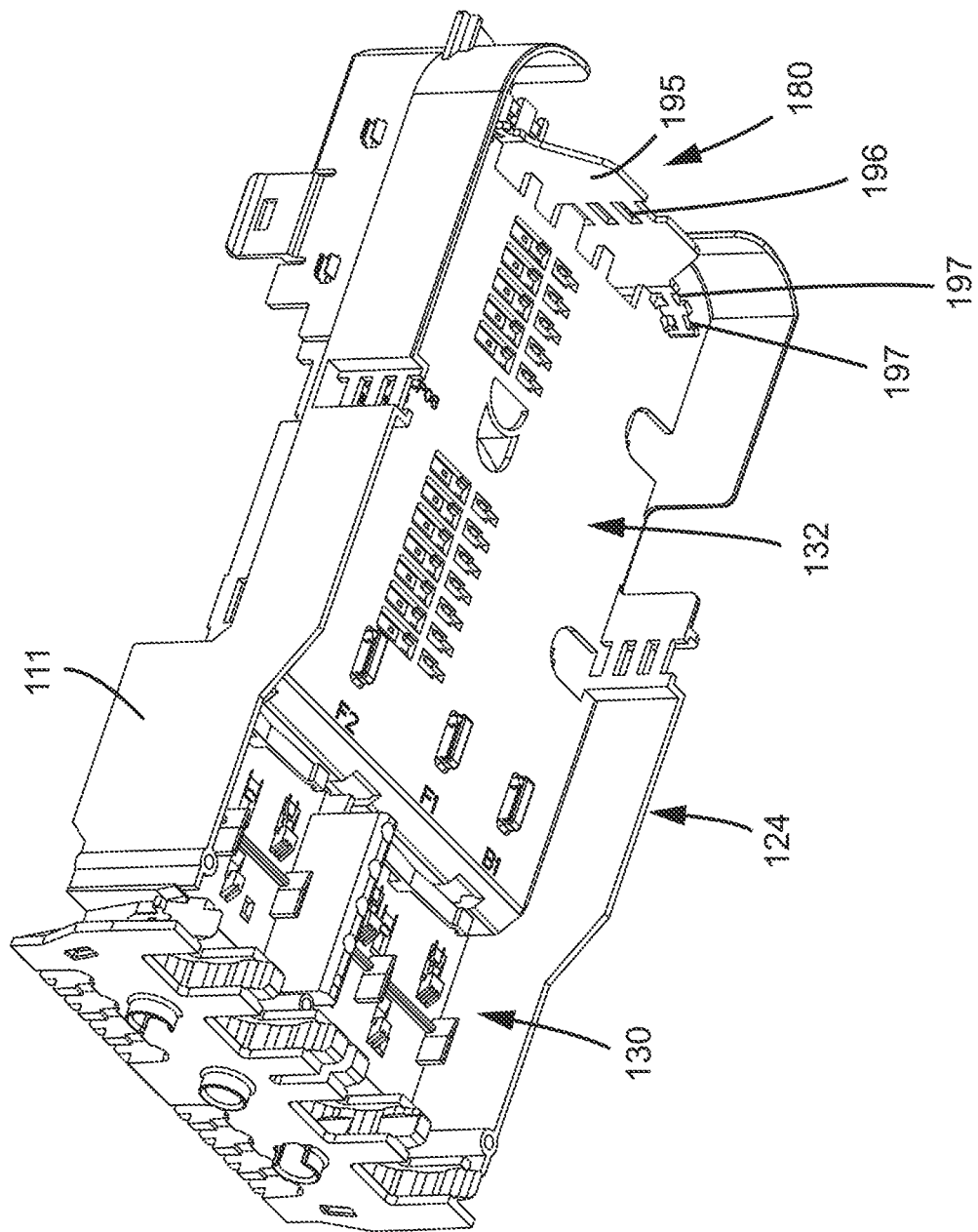
FIG. 14 is a bottom perspective view of the main body of FIG. 13.
Figure 15:
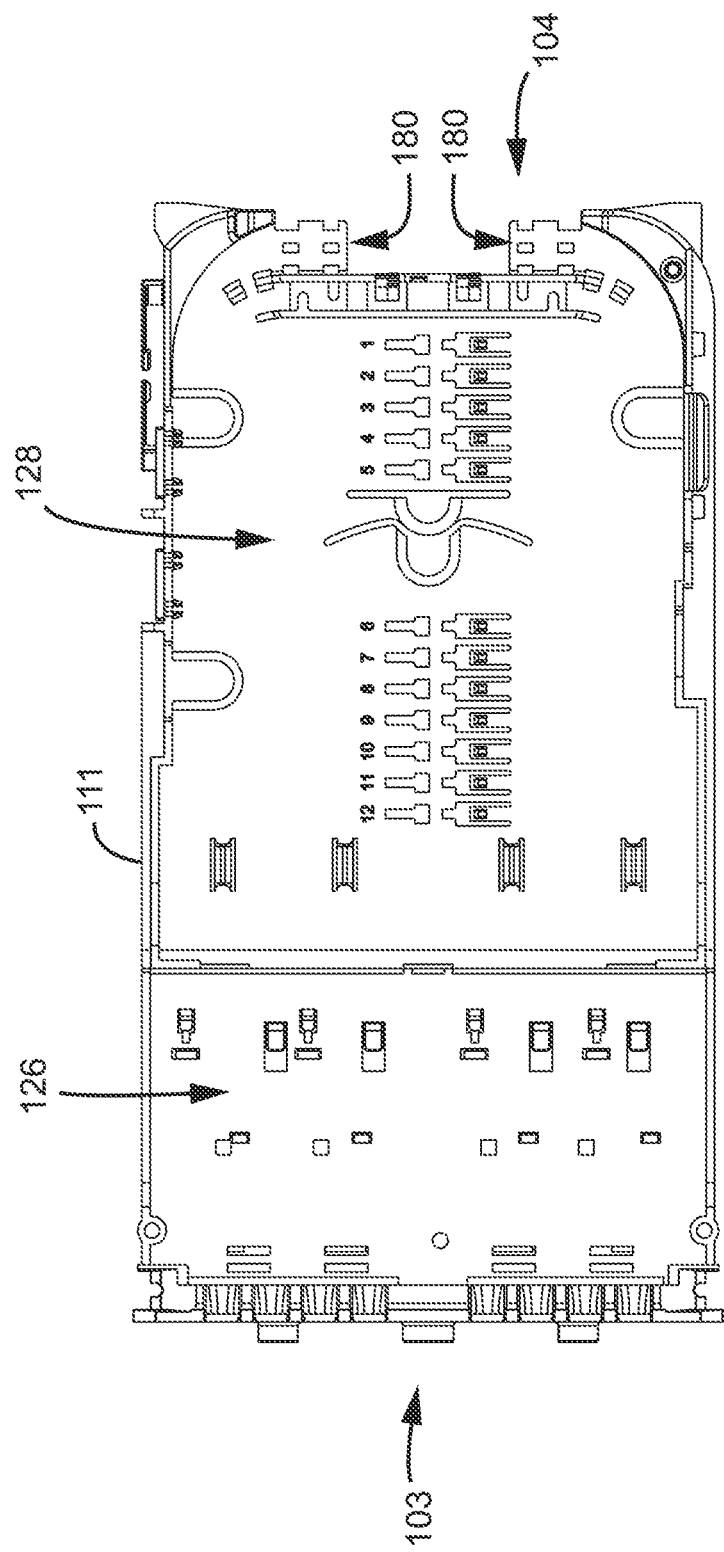
FIG. 15 is a top planar view of the main body of FIG. 13.
Figure 19:
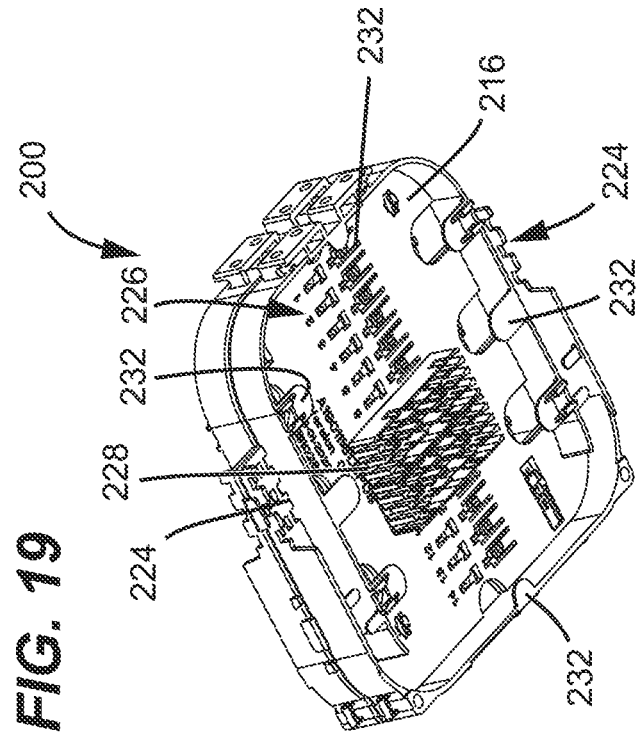
FIG. 19 is a bottom perspective view of the upper back-to-back tray of the organizer of FIG. 3.
Figure 18:
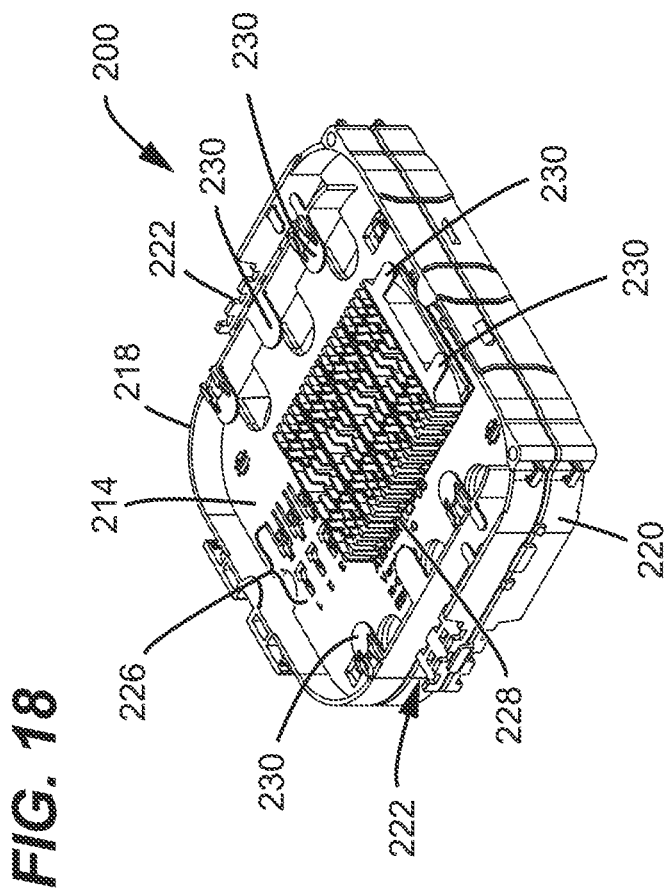
FIG. 18 is a top perspective view of the upper back-to-back tray of the organizer of FIG. 3.
Figure 20:
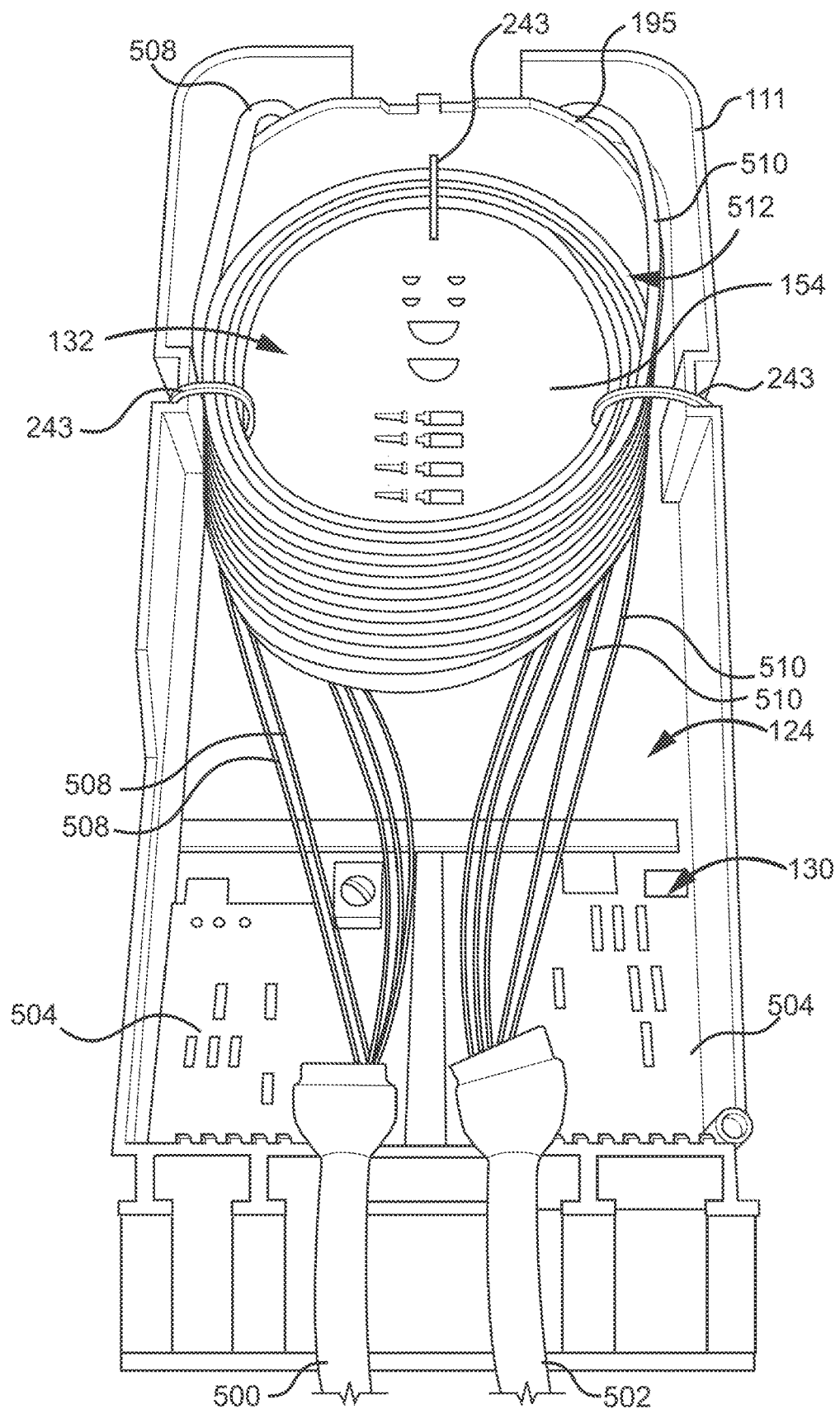
FIG. 20 is a bottom perspective view of the organizer of FIG. 3 showing a pair of feeder or branch cables entering the closure and fixed to the organizer, sheathed groups of fibers extending from the feeder cables being looped in the lower fiber management portion of the organizer.

The upper fiber management tray 200 includes a first fiber management surface 214 facing a first direction 215 and a second fiber management surface 216 facing the opposite direction 217 of the first direction 215. Thus, the first and second surfaces 214 and 216 are back to back. A wall 218 projects from the surface 214 in the first direction 215 about at least a portion of an outer perimeter of the fiber management surface 214. A wall 220 projects from the fiber management surface 216 in the second direction 217 about at least a portion of the outer perimeter of the second fiber management surface 216. Entryways 222, 224 on the front and back sides of the tray 200 provide fiber access onto the fiber management surfaces 214 and 216, respectively. Fibers, or sheathed fibers, can enter the front or back areas of the tray 200 via the channels 180 and the entryways 222, 224. The entryways 222, 224 can include toothed structures 237, 239 defining clipping interfaces to securely mount fiber sheath couplers 241 (FIGS. 23, 26, 27) at the respective entryway 222, 224, e.g., with zip ties 243. In the fiber management portion 132 of the lower region 124, looped sheaths of fibers can be tied, e.g., using a zip tie 243 to a support wall 195 projecting vertically downward from the wall 154. The support wall 195 can define holes 196 and or notches 197 to receive such a zip tie 243 (FIGS. 14, 20).

Each of the first and second fiber management surfaces 214 and 216 defines structures 226 for mounting optical fiber splice holders 228 or other fiber management components (such as splitters, splitter holders wave division multiplexors, etc.) at the first and second fiber management surfaces, respectively. The structures 226 at the first and second surfaces 214 and 216 are structurally identical to each other and include tapered openings and retaining members in the form of cantilever arms. The splice holders mounted at the surfaces 214, 216 can be configured to hold individual fiber to individual fiber splice bodies at a plurality of longitudinally aligned splice body locations and/or multiple fiber to multiple fiber splice bodies (e.g., with fiber ribbons) at a plurality of longitudinally aligned splice body locations. In some examples, the surface 214 is fitted with single fiber splice body holders, while the surface 216 is fitted with multi-fiber splice body holders, or vice versa.

Fiber retainers or fingers 230, 232 project parallel to the surfaces 214, 216 (transversely when the tray 200 is in the pivoted down or storage position) from the walls the 218 and 220 to aid in retaining looped fibers at the corresponding surface 214, 216 of the tray 200. Optionally, in some example embodiments (FIGS. 26-27) additional fiber retainers or fingers 250 and 252 can be provided generally centrally, projecting from the surfaces 214, 216, to retain S-curve routing of fibers at the surfaces 214, 216. S-curves can be used to switch the routing direction of at least some of the fibers so that fibers that are to be spliced to each other transversely approach the appropriate splice location from opposite directions. At each surface 214, 216, the retainers 250, 252 can be placed longitudinally between two sets of the optical management component mounting structures 226.

The main body 111 includes a flange 192 vertically projecting from the wall 191 which is transversely opposite the wall 190 that hingedly supports the tray 200. The flange 192 defines an opening 193. The back-to-back tray 200 includes a catch 234. The catch 234 and the opening 193 opening are configured to mechanically engage each other to lock the tray 200 in a pivoted down position. The flange 192 has flexible resilience that allows the catch to be disengaged from the opening 193 in order to pivot the tray 200 into the pivoted up or access position about the hinge axis 210. The hinge clips 202 can be configured to resist further pivoting of the tray 200 beyond a particular angle (e.g., beyond 90 degrees or more from the storage configuration or more). Additional pivot stop mechanisms can be provided to hold the tray 200 at a desired pivoted up position relative to the main body 111.

Referring to FIGS. 3-19, the organizer 100 includes a lower fiber management tray 300 that is also pivotally coupled to the main body 111 at the upper fiber management portion 128. The tray 300 includes a wall 302 dividing a first fiber loop storage basket 304 defined by the tray 300 from a second fiber loop storage basket 306 defined by the tray 300. The baskets 304 and 306 face opposite directions 308 and 310, respectively. Thus, the tray 300 is a back-to-back tray. The wall 302 includes a surface 312 facing the direction 308, and a surface 314 facing the opposite direction 310. Projecting from the surface 312 in the direction 308 is a wall 316 about a portion of an outer perimeter of the surface 312. Projecting from the surface 314 in the direction 310 is a wall 318 about a portion of an outer perimeter of the surface 314. Projecting from the walls 316, 318 parallel to the surfaces 312, 314 (transversely when the tray 300 is in the pivoted down or storage position) are fiber retainers or fingers 320, 322. The surface 312, the wall 316 and the retainers 320 define the basket 304. The surface 314, the wall 318 and the retainers 322 define the basket 306.

Entryways 324, 326 are provided for fibers, or sheathed groups of fibers to be guided onto the respective fiber management surface 312, 314. The entryways 324, 326 can include guide channels 328 to which protective sheaths of fiber groups can be secured. In addition to using the entryways 324, 326 to guide fibers on and off the tray 300, the entryways 324, 326 can be used to guide fibers from one of the baskets 304, 306 to the other of the baskets 304, 306.

At the distal end of the tray 300 are hinge elements (e.g., hinge pins) 330 that are complementary to hinge elements 140 of the main body 111. The hinge elements 330 can couple with the hinge elements 140 to form a hinge 332 defining a hinge axis or pivot axis 334. A pivot stop 336 can restrict pivoting of the tray 300 about the hinge axis 334 beyond a maximum pivot angle (e.g., 90 degrees or more) from the pivot down or storage position of the tray 300 with respect to the main body 111.

When the trays 200 and 300 are both in the pivot down or storage positions the trays 300 and 200 are vertically stacked one above the other, and the surfaces 214, 216, 312 and 314 are generally all oriented horizontally and generally parallel to one another.

To access the lower tray 300, the upper tray 200 is pivoted up about its hinge axis 210 in a first pivot direction 260. To access the surface 314 of the lower tray, the lower tray 300 is then pivoted up about its hinge axis 354 in a second pivot direction 360. Due to the positioning and orientation of the hinge axes 210 and 354, the pivot directions 260 and 360 are different. For example, the pivot directions can be offset by 90 degrees, by 180 degrees, or by some other non-zero angle therebetween. In addition the hinge axes 210 and 334 are angularly offset from each other by an angle α. The angle α can be, e.g., 90 degrees, 180 degrees, or some angle therebetween. By separating the hinges, the pivot axes, and the pivot directions, organization of the fibers at the fiber organizer 100 can be improved.

Optionally, the organizer 100 includes an adapter mounting module 400. The module 400 includes latch arms 402 configured to releasably catch and lock at openings 404 defined by the main body 111. The module 400 is configured to mount the adapter banks 402 and includes a guide channel 404. Connectorized optical fibers from the basket 306 of the tray 300 can be routed to the adapters 152 via the guide channel 404.

Referring now to FIGS. 20-27, example fiber routing configurations using the organizer 100 will be described.

Referring to FIG. 20, feeder (or branch) cables 500 and 502 enter the closure and are fixed to cable fixation plate assemblies 504 positioned at the cable fixation portion 130 of the lower region 124 of the main body 111. One of the cables 500, 502 can be a provider side cable and the other cable 500, 502 can be a subscriber side cable. The outer jackets of the feeder (or branch) cables 502 and 504 have been stripped, exposing sheaths 508, 510 that hold and protect a plurality of loose fibers, e.g., 4, 6, 8, 10, 12 or more fibers per sheath 508, 510. Most of the sheaths 508, 510 of fibers are stored in loops 512 in the lower fiber management portion 132. Some of the sheaths 508, 510 are routed to the upper region 122 of the main body 111 via the channels 180.

Figure 21:
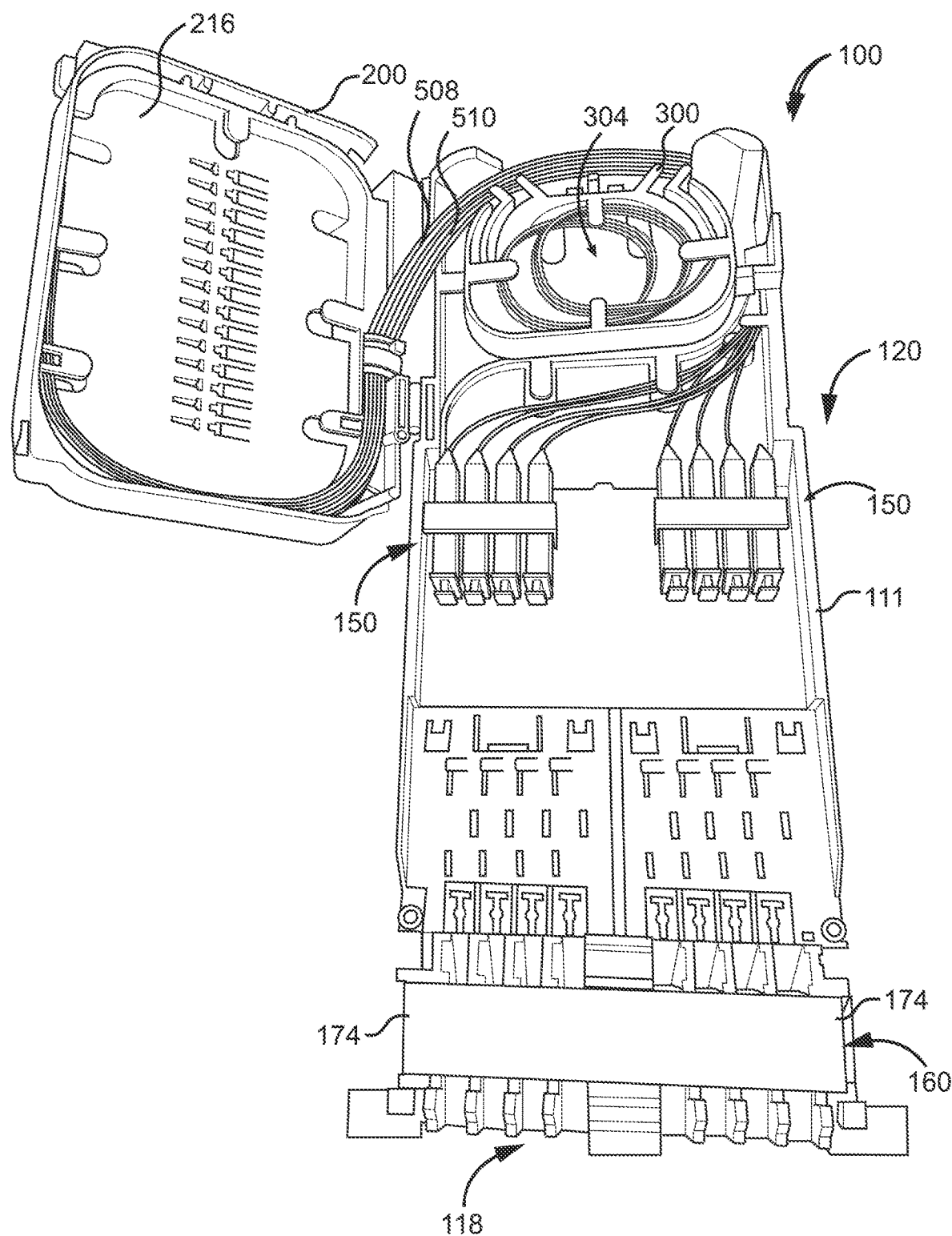
FIG. 21 is a top perspective view of the organizer of FIG. 3, showing fiber routing configurations at the lower side of the back-to-back upper tray and the upper side of the back-to-back lower tray.
Figure 22:
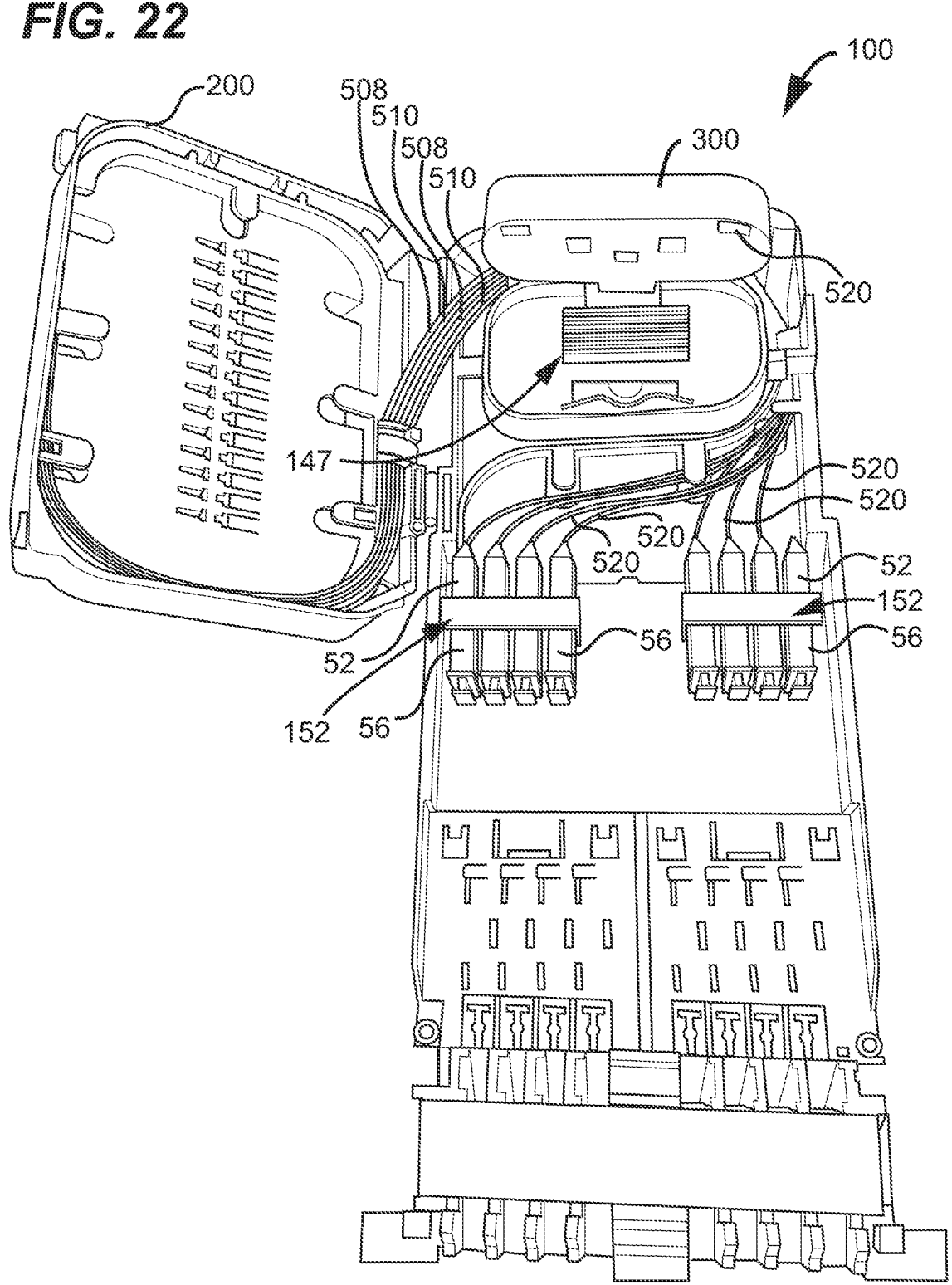
FIG. 22 is a top perspective view of the organizer and routing configurations of FIG. 21, with the back-to-back lower tray in a pivoted up position.
Figure 23:
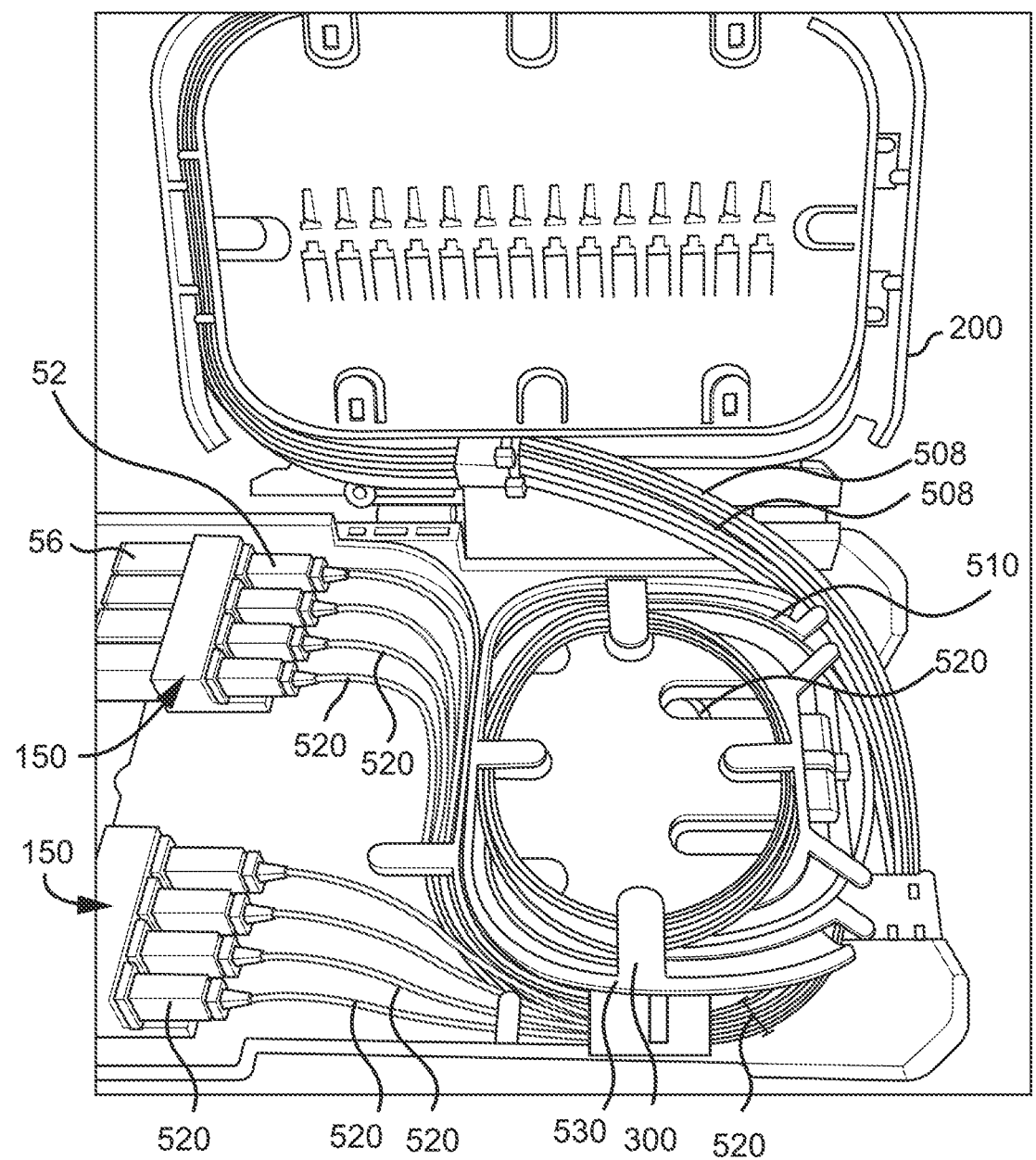
FIG. 23 is an enlarged view of a portion of the components of FIG. 21.

Referring to FIGS. 21-23, one of the sheaths 508 of fibers and one of the sheaths 510 of fibers are routed onto the fiber management surface 216 of the back-to-back tray 200 and another of the sheaths 508 of fibers and another of the sheaths 510 of fibers are routed onto the fiber management surface 214 of the back-to-back tray 200.

In addition, one of the sheaths 510 of fiber is routed to the basket 304 of the tray 300 where it is stored in loops. At the basket 304, the sheath 510 is stripped to expose the fibers (e.g., 12 fibers) held by that sheath.

Figure 24:
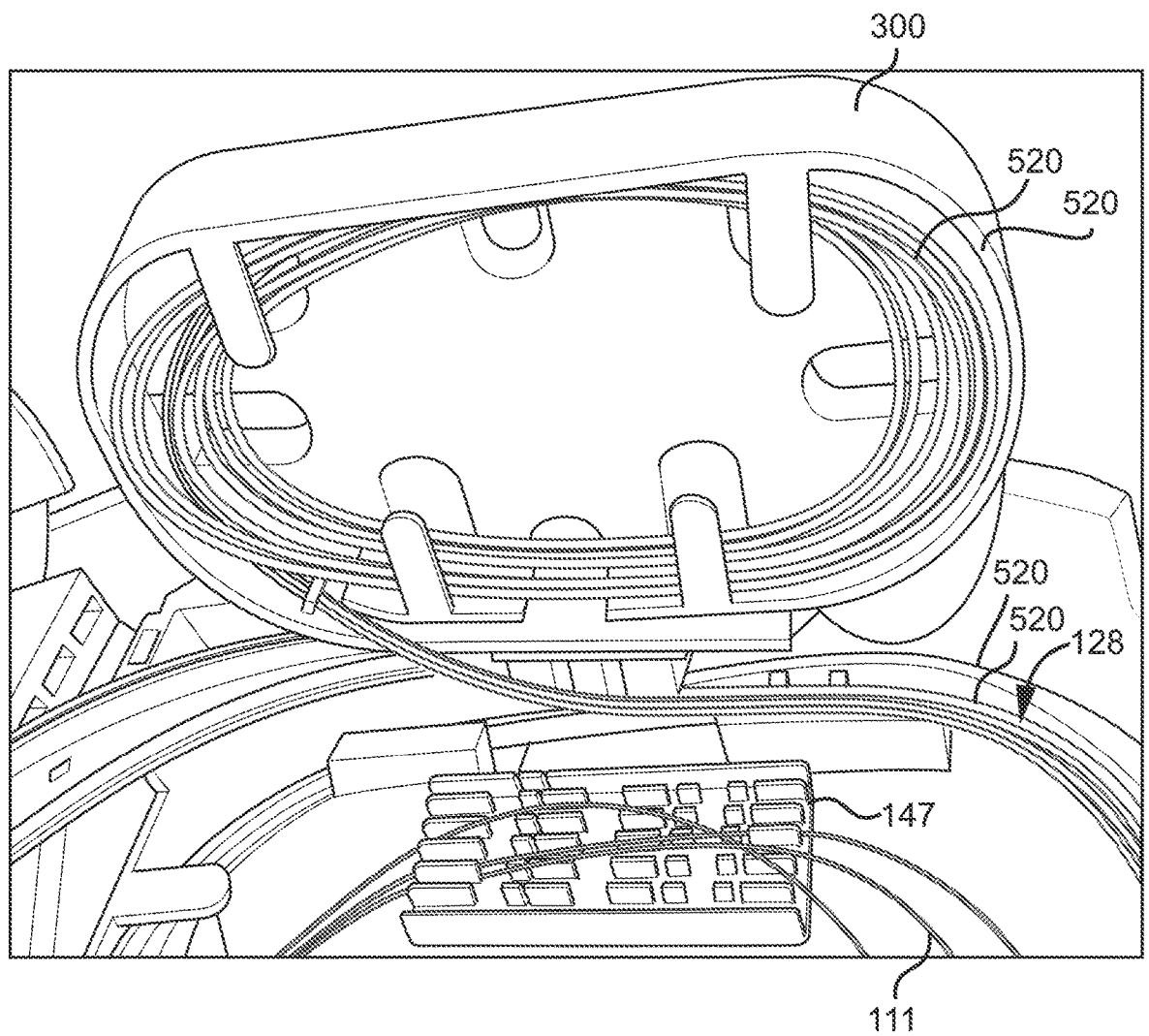
FIG. 24 is an enlarged view of the lower side of the back-to-back lower tray of FIG. 21.
Figure 25:
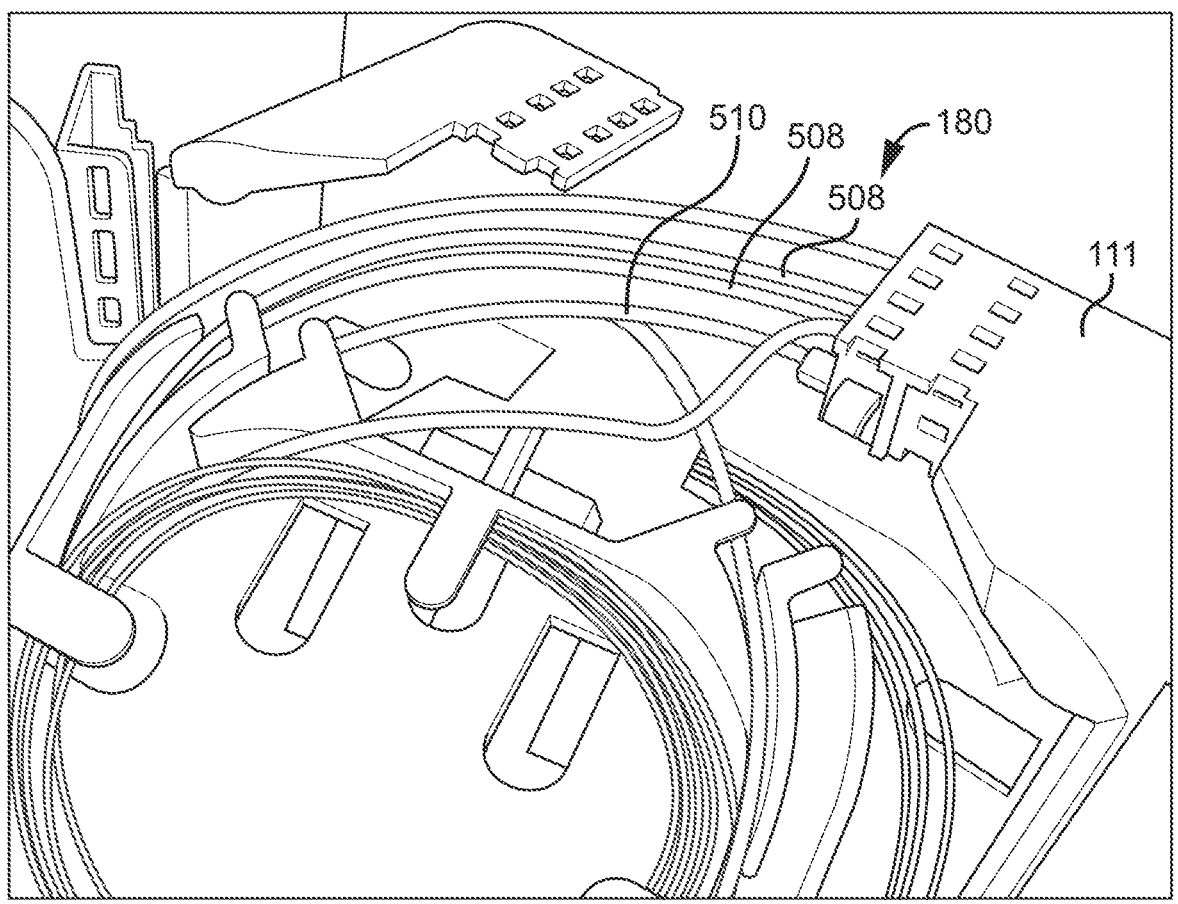
FIG. 25 is a perspective view of a portion of the organizer as in FIG. 21.

Those loose fibers 520 are routed from the basket 304 to the basket 306 as shown in FIGS. 22 and 24. Optionally, one or more of the fibers 520 that are then routed off the basket 306 below the tray 300 toward the adapter banks 150 can be spliced to connectorized pigtails at splices held by a splice holder 147 mounted to the main body 111 at the fiber management portion 128 of the upper region 122. Alternatively, one or more of the loose fibers 520 that are routed off the basket 306 toward the adapter blocks 150 are connectorized and not spliced to pigtails that include the connectors 52. Either way, the connectorized fibers 520 or connectorized pigtails that have been spliced to the fibers 520 are optically connected via the adapters 152 to fibers of drop cables entering the closure at the upper region 122 of the organizer 100 and terminated at connectors 56.

Figure 26:
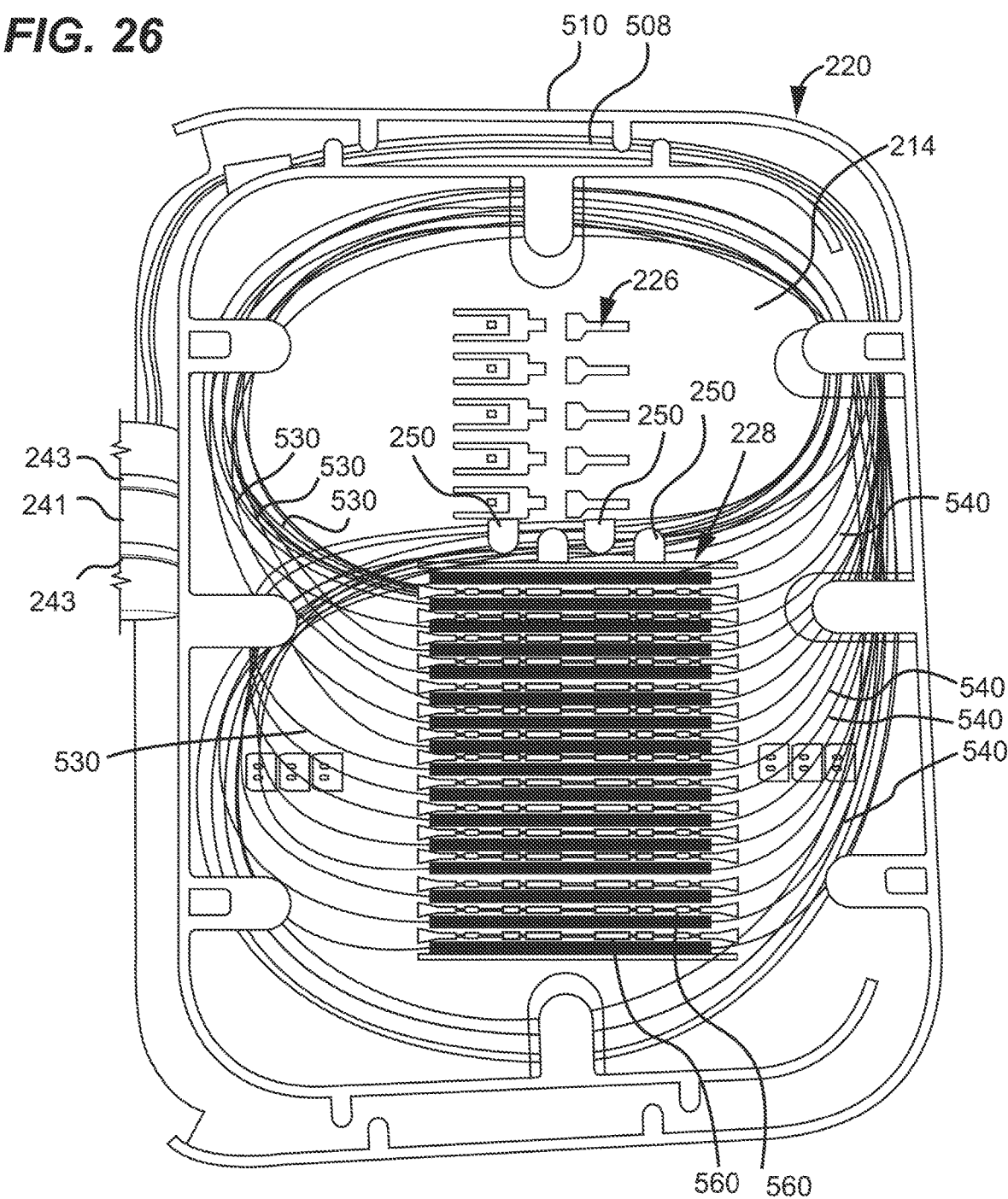
FIG. 26 is a planar view of an example fiber routing configuration on the upper side of the back-to-back upper tray of the organizer of FIG. 21.

Referring to FIG. 26, at the surface 214 of the back-to-back tray 200, the sheaths 508 and 510 are stripped to expose the fibers 530, 540, therein. The fibers 530 are spliced to the fibers 540 and the splice bodies 560 are held by splice holders 228 supported at the surface 214. In this manner, optical signals from one of the cables 500, 502 are routed to the other cable 500, 502 via the surface 214 of the back-to-back tray 200.

Figure 27:
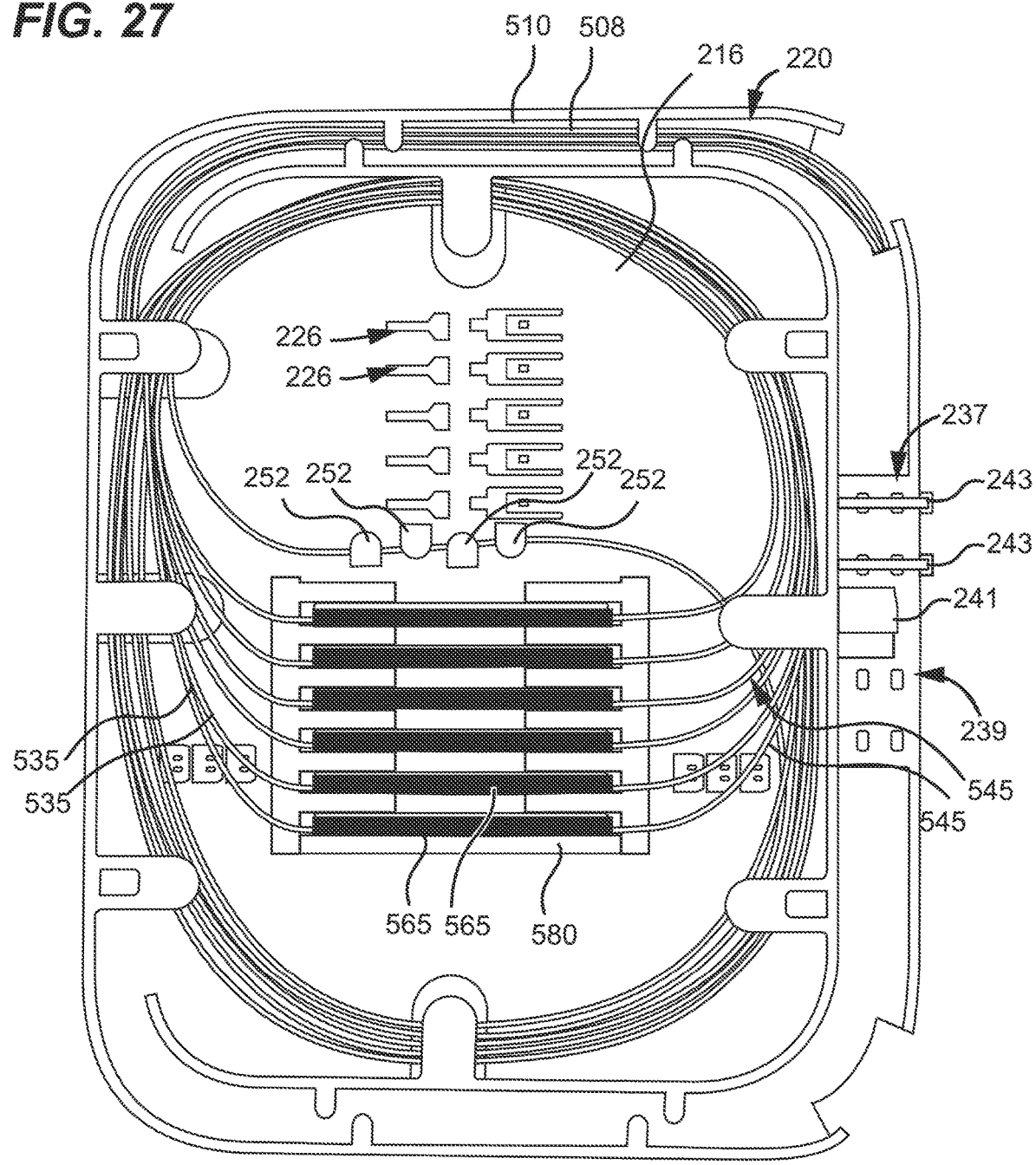
FIG. 27 is a planar view of an example fiber routing scheme on the lower side of the back-to-back upper tray of the organizer of FIG. 21.
Figure 28:
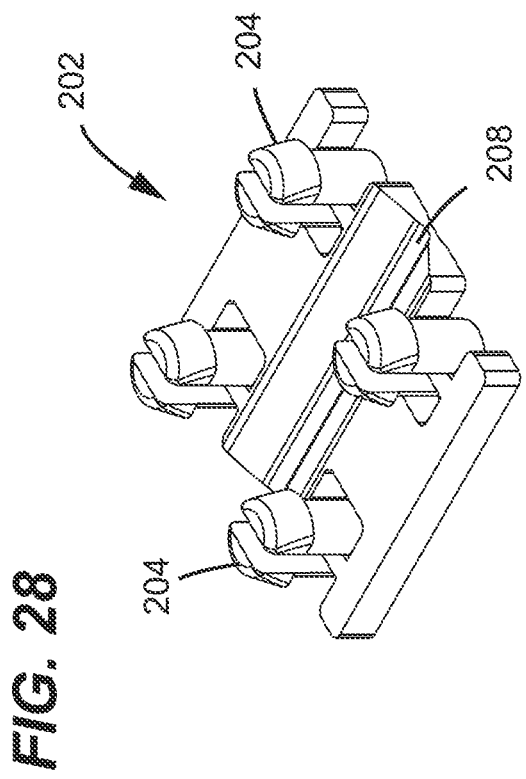
FIG. 28 is a perspective view of a hinge clip of the organizer of FIG. 3.
Figure 29:
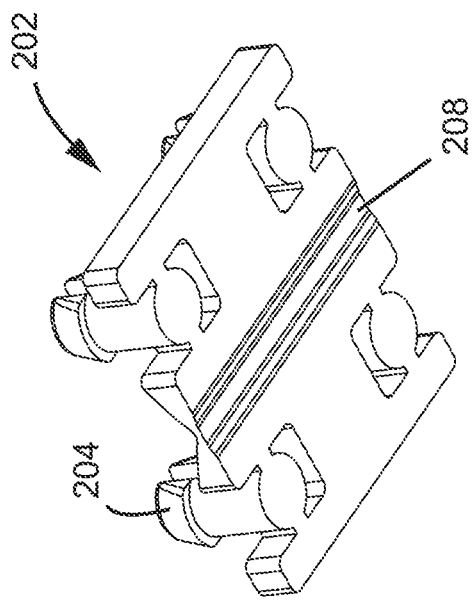
FIG. 29 is a further perspective view of the hinge clip of the organizer of FIG. 3.

Referring to FIG. 27, at the surface 216 of the back-to-back tray 200, the sheaths 508 and 510 are stripped to expose the fibers 535, 545 therein. The fibers 535 are spliced to the fibers 545 and the splice bodies 565 are held by splice holders 580 supported at the surface 216. In this manner, optical signals from one of the cables 500, 502 are routed to the other cable 500, 502 via the surface 216 of the back-to-back tray 200.

The back-to-back nature of the tray 200 allows the tray 200 to support a large number of splices, e.g., up to 48 splices or more on either side of the tray, thereby improving the fiber management capacity of the organizer 100.

In some examples, one or more splitters supported by the organizer 100 can split signals from a provider side fiber to a plurality of subscriber side fibers, all of which fibers are routed according to one or more of the routing configurations or portions of routing configurations using the organizer 100 and described herein.

From the foregoing detailed description, it will be evident that modifications and variations can be made in the devices of the disclosure without departing from the spirit or scope of the invention.

What is claimed is:

1. A fiber management organizer for a telecommunications closure, comprising:
a main body extending along a vertical axis of the fiber management organizer from a bottom of the main body to a top of the main body, the main body including a horizontal wall perpendicular to the vertical axis, the horizontal wall dividing an upper region vertically above the wall from a lower region vertically below the wall, the horizontal wall including an upper surface facing vertically upward that defines the upper region and a lower surface facing away from the upper surface and vertically downward that defines the lower region, the upper region including an upper cable fixation portion and an upper fiber management portion, the lower region including a lower cable fixation portion and a lower fiber management portion; and a first fiber management tray pivotally coupled to the main body at the upper fiber management portion, such that when the first fiber management tray is fully pivoted down onto the main body and in a storage position, the fiber management tray is vertically above the upper region and vertically above the lower region, the first fiber management tray including:
 a first fiber management surface facing a first direction;
 a second fiber management surface facing a second direction opposite the first direction;
 a first wall projecting from the first fiber management surface in the first direction about at least a portion of an outer perimeter of the first fiber management surface; and
 a second wall projecting from the first fiber management surface in the second direction about at least a portion of an outer perimeter of the second fiber management surface;
wherein each of the first fiber management surface and the second fiber management surface defines structures for mounting optical fiber splice holders at the first and second fiber management surfaces, respectively.

2. The fiber management organizer of claim 1, wherein the structures of the first and second fiber management surfaces are structurally identical to each other.

3. The fiber management organizer of claim 1,
wherein the main body includes a flange defining an opening;
wherein the first fiber management tray includes a catch; and
wherein the catch and the opening are configured to mechanically engage each other to lock the first fiber management tray in a pivoted down position.

4. The fiber management organizer of claim 1, further comprising:
 a second fiber management tray pivotally coupled to the main body at the upper fiber management portion, the second fiber management tray including a wall dividing a first fiber loop storage basket defined by the second fiber management tray from a second fiber loop storage basket defined by the second fiber management tray.

5. A fiber management organizer for a telecommunications closure, comprising:
 a main body including a wall defining an upper region above the wall and a lower region below the wall, the upper region including an upper cable fixation portion and an upper fiber management portion, the lower region including a lower cable fixation portion and a lower fiber management portion;
 a first fiber management tray pivotally coupled to the main body at the upper fiber management portion, the first fiber management tray including:
  a first fiber management surface facing a first direction;
  a second fiber management surface facing a second direction opposite the first direction;
  a first wall projecting from the first fiber management surface in the first direction about at least a portion of an outer perimeter of the first fiber management surface; and
  a second wall projecting from the first fiber management surface in the second direction about at least a portion of an outer perimeter of the second fiber management surface, wherein each of the first and second fiber management surfaces defines structures for mounting optical fiber splice holders at the first and second fiber management surfaces, respectively; and
 a second fiber management tray pivotally coupled to the main body at the upper fiber management portion, the second fiber management tray including a wall dividing a first fiber loop storage basket defined by the second fiber management tray from a second fiber loop storage basket defined by the second fiber management tray,
wherein the first fiber management tray and the second fiber management tray are pivotally coupled to the main body with first and second hinges defining first and second pivot axes and first and second pivot directions about the pivot axes, respectively, the first and second pivot directions being different from each other.

6. The fiber management organizer of claim 5, wherein the first and second pivot directions are offset from each other by about 90 degrees.

7. The fiber management organizer of claim 1, further comprising:
 a first group of optical fibers extending from the lower fiber management portion to the first fiber management surface, the first group of optical fibers being spliced to second optical fibers at splices held at splice holders mounted to the first structures, the second optical fibers extending from the first fiber management surface to the lower fiber management portion; and
 a third group of optical fibers extending from the lower fiber management portion to the second fiber management surface, the third group of optical fibers being spliced to fourth optical fibers at splices held at splice holders mounted to the second structures, the fourth optical fibers extending from the first fiber management surface to the lower fiber management portion.

8. The fiber management organizer of claim 7, wherein lengths of the first group of optical fibers and of the third group of optical fibers supported at the first and second fiber management surfaces, respectively, are housed in sheaths secured, respectively, to the first fiber management surface and the second fiber management surface.

9. The fiber management organizer of claim 7, wherein the first group of optical fibers extend from a provider side branch cable and the second optical fibers extend from a subscriber side branch cable.

10. The fiber management organizer of claim 9, wherein the third group of optical fibers extend from a provider side branch cable and the fourth optical fibers extend from a subscriber side branch cable.

11. A fiber management organizer for a telecommunications closure, the fiber management organizer extending along a longitudinal axis between a proximal end and a distal end of the fiber management organizer, along a transverse axis between a first side and a second side of the fiber management organizer, and along a vertical axis between a top and a bottom of the fiber management organizer, the fiber management organizer comprising:
 a main body including a wall defining an upper region above the wall and a lower region below the wall, the upper region including an upper cable fixation portion and an upper fiber management portion, the lower region including a lower cable fixation portion and a lower fiber management portion;
 a first fiber management tray pivotally coupled to the main body at the upper fiber management portion by a first hinge defining a first pivot axis, the first fiber management tray being pivotal in a first pivot direction about the first pivot axis between a first storage position and a first access position; and a second fiber management tray pivotally coupled to the main body at the upper fiber management portion by a second hinge defining a second pivot axis, the second fiber management tray being pivotal about the second pivot axis in a second pivot direction between a second storage position and a second access position, wherein the first fiber management tray and the second fiber management tray are vertically stacked one above the other when the first fiber management tray and the second fiber management tray are in the first storage position and the second storage position, respectively; and wherein the first pivot direction and the second pivot direction are different from each other.

12. The fiber management organizer of claim 11, wherein the first pivot direction and the second pivot direction are offset from each other by about 90 degrees.

13. The fiber management organizer of claim 11, wherein the first pivot direction and the second pivot direction are offset from each other by about 180 degrees.

14. A fiber management organizer for a telecommunications closure, comprising:

a main body extending along a vertical axis of the fiber management organizer from a bottom of the main body to a top of the main body, the main body including a horizontal wall perpendicular to the vertical axis, the horizontal wall dividing an upper region vertically above the wall from a lower region vertically below the wall, the horizontal wall including an upper surface facing vertically upward that defines the upper region and a lower surface facing away from the upper surface and vertically downward that defines the lower region, the upper region including an upper cable fixation portion and an upper fiber management portion, the lower region including a lower cable fixation portion and a lower fiber management portion;

a first fiber management tray pivotally coupled to the main body at the upper fiber management portion, such that when the first fiber management tray is fully pivoted down onto the main body and in a storage position, the first fiber management tray is vertically above the upper region and vertically above the lower region, the first fiber management tray including a wall dividing a first fiber loop storage basket defined by the first fiber management tray from a second fiber loop storage basket defined by the first fiber management tray; and a group of sheathed optical fibers housed in a sheath, a first length of the sheath being stored at the lower fiber management portion, the sheath extending from the lower fiber management portion to the first fiber loop storage basket, a second length of the sheath being stored in the first fiber loop storage basket, the sheath terminating at a sheath end positioned in the first fiber loop storage basket, the group of optical fibers extending from the sheath end to the second fiber loop storage basket via a fiber pathway defined by the first fiber management tray, first lengths of the group of optical fibers being stored in loops in the second fiber loop storage basket.

15. The fiber management organizer of claim 14, wherein second lengths of the group of optical fibers extend from the second fiber loop storage basket and are terminated at fiber optic connectors.

16. The fiber management organizer of claim 15, wherein the fiber optic connectors are terminated at a bank of fiber optic adapters mounted to the main body.

17. A method, comprising:

providing a fiber management organizer for a telecommunications closure, including a main body extending along a vertical axis of the fiber management organizer from a bottom of the main body to a top of the main body, the main body including a horizontal wall perpendicular to the vertical axis, the horizontal wall dividing an upper region vertically above the wall from a lower region vertically below the wall, the horizontal wall including an upper surface facing vertically upward that defines the upper region and a lower surface facing away from the upper surface and vertically downward that defines the lower region, the upper region including an upper cable fixation portion and an upper fiber management portion, the lower region including a lower cable fixation portion and a lower fiber management portion;

routing a first optical fiber from the lower fiber management portion to a first side of a back-to-back fiber management tray pivotally coupled to the main body, the back-to-back fiber management tray being pivotally coupled to the main body such that when the back-to-back fiber management tray is fully pivoted down onto the main body and in a storage position, the back-to-back fiber management tray is vertically above the upper region and vertically above the lower region; and routing the first optical fiber from the first side of the back-to-back fiber management tray to a second side of the back-to-back fiber management tray, the second side being opposite the first side.

18. The method of claim 17, further comprising pivoting the back-to-back fiber-management tray relative to the main body to access the second side.

19. The method of claim 17, further comprising coupling a fiber optic connector terminating the first optical fiber to a fiber optic adapter mounted at the upper region.

20. The method of claim 17, further comprising, prior to the routing the first optical fiber from the first side of the back-to-back fiber management tray:

stripping a length of a sheath holding the first optical fiber to expose the first optical fiber, a portion of the sheath being supported at the first side of the back-to-back fiber management tray.

\* \* \* \* \*